US012603527B2

(12) United States Patent (10) Patent No.: US 12,603,527 B2
Yoshino et al. (45) Date of Patent: Apr. 14, 2026

(54) ENERGY COLLECTION DEVICE AND RECTIFIER CIRCUIT

(71) Applicant: SONY SEMICONDUCTOR SOLUTIONS CORPORATION, Kanagawa (JP)

(72) Inventors: Yoshitaka Yoshino, Tokyo (JP); Yuta Toeda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/721,274

(22) PCT Filed: Dec. 26, 2022

(86) PCT No.: PCT/JP2022/047937
§ 371 (c)(1),
(2) Date: Jun. 18, 2024

(87) PCT Pub. No.: WO2023/127802
PCT Pub. Date: Jul. 6, 2023

(65) Prior Publication Data
US 2025/0253712 A1 Aug. 7, 2025

(30) Foreign Application Priority Data
Dec. 28, 2021 (JP) ................................. 2021-214728

(51) Int. Cl.
*H02J 50/27* (2016.01)
*H02J 50/00* (2016.01)
*H02M 7/217* (2006.01)
(52) U.S. Cl.
CPC ............ *H02J 50/27* (2016.02); *H02J 50/005* (2020.01); *H02M 7/217* (2013.01)

(58) Field of Classification Search
None
See application file for complete search history.

(56) References Cited

U.S. PATENT DOCUMENTS

2002/0190689 A1 12/2002 Nakamura et al.
2017/0081158 A1* 3/2017 Jaipaul ................... H01Q 1/007
(Continued)

FOREIGN PATENT DOCUMENTS

JP 2003-088005 3/2003
JP 2011-114949 6/2011
(Continued)

OTHER PUBLICATIONS

English Translation of International Search Report prepared by the Japan Patent Office on Feb. 24, 2023, for International Application No. PCT/JP2022/047937, 2 pgs.

*Primary Examiner* — Rexford N Barnie
*Assistant Examiner* — Joel Barnett
(74) *Attorney, Agent, or Firm* — SHERIDAN ROSS P.C.

(57) ABSTRACT
An energy collection device that increases output power to be collected is provided. Provided is an energy collection device that includes: an antenna unit having a dipole structure, the antenna unit including a first antenna element that is in contact with an industrial product metal portion or a human body and functions as an antenna, and a second antenna element including a conductor, the antenna unit receiving electric field energy of a radio wave and a quasi-electrostatic field existing in space; a rectifier circuit provided with a switching element that rectifies alternating current (AC) energy output from the antenna unit; and a power storage capacitor configured to store charge output from the rectifier circuit, in which the power storage capacitor has a capacitance value of at least 1 μF or more in order to receive power in a low frequency band.

20 Claims, 37 Drawing Sheets

(56)               References Cited

U.S. PATENT DOCUMENTS

| 2018/0212523 | A1* | 7/2018 | Leabman | .......... | H02M 3/33592 |
|---|---|---|---|---|---|
| 2019/0148985 | A1* | 5/2019 | Barukh | .................. | H01Q 19/30 |
| | | | | | 307/104 |
| 2022/0158497 | A1* | 5/2022 | Babakhani | .............. | H02J 50/27 |
| 2022/0181909 | A1* | 6/2022 | Lee | ....................... | H02J 50/001 |

FOREIGN PATENT DOCUMENTS

| JP | 2014-183728 | | 9/2014 |
|---|---|---|---|
| JP | 2014183728 A | * | 9/2014 |

* cited by examiner

RECTIFIER CIRCUIT 2
AND
POWER STORAGE CAPACITOR 3

RECTIFIER CIRCUIT 2
AND
POWER STORAGE CAPACITOR 3

RECTIFIER CIRCUIT 2
AND
POWER STORAGE CAPACITOR 3

FIRST ANTENNA ELEMENT

SECOND ANTENNA ELEMENT

FIRST ANTENNA ELEMENT

SECOND ANTENNA ELEMENT

FIRST ANTENNA ELEMENT

SECOND ANTENNA ELEMENT

FIRST ANTENNA ELEMENT

SECOND ANTENNA ELEMENT

ENERGY COLLECTION DEVICE AND RECTIFIER CIRCUIT

CROSS REFERENCE TO RELATED APPLICATIONS

This application is a national stage application under 35 U.S.C. 371 and claims the benefit of PCT Application No. PCT/JP2022/047937, having an international filing date of 26 Dec. 2022, which designated the United States, which PCT application claimed the benefit of Japanese Patent Application No. 2021-214728, filed 28 Dec. 2021, the entire disclosures of each of which are incorporated herein by reference.

TECHNICAL FIELD

The present technology relates to a rectifier circuit connected to an antenna unit having an energy harvesting function, and an energy collection device including the antenna unit and the rectifier circuit.

BACKGROUND ART

Converting energy of radio waves such as broadcast waves and the like present around us into power (energy harvesting) has been considered. In the case of environmental power generation, the current flowing through an antenna to a circuit is rectified into direct current (DC) and converted into electric energy. A diode is used to rectify radio waves into DC. A rectifier circuit-equipped antenna is called a rectenna.

RF energy harvesting that receives a radio wave from a distant world such as a broadcast wave or Wi-Fi (registered trademark) and converts the received radio wave into energy is being developed and studied by universities and companies. In a case where such a radio wave is received, the power induced in the antenna is very small. The radio wave has a characteristic that the reception power decreases depending on the distance. That is, for example, when the radio wave is received by an antenna with an antenna efficiency of 80% at a certain reference frequency, the power induced to the output of the antenna is −20 dBm (10 μW) at a distance of 7.5 km in digital television broadcasting using the UHF band, and 300 m in an 800 to 900 MHz band of the mobile phone. That is, as the distance from the transmission antenna increases, the reception power decreases.

Such efforts to return the energy of radio waves to power have been made at the Kanazawa Institute of Technology and ATR (Advanced Communication Research Institute International). Various attempts have been made in the experiment, but the output voltage is about 0.7 to 1.5 V, and it is known that it is difficult to obtain a high voltage for charging a battery. Furthermore, currently, in the Ministry of Internal Affairs and Communications, since it is difficult to obtain power from the surrounding electric field from the results described above, wireless power transfer (WPT) is being considered. In WPT, a system for supplying power to an IoT sensor or a wearable device by radiating a dedicated radio wave from a transmitter using a 900 MHz band, a 2 GHz band, and a 5 GHz band has been studied. WPT is similarly studied in various countries around the world, and spread worldwide.

For example, Patent Literature 1 describes a reception device in a WPT-like system. In Patent Literature 1, a plurality of antennas, a plurality of rectenna rectifier circuits connected to the respective antennas, and a connection switching circuit that switches a serial-parallel connection state on the output side of the plurality of rectenna rectifier circuits are provided, and the serial-parallel connection state is selected so as to maximize RF-to-DC conversion efficiency.

CITATION LIST

Patent Document

Patent Document 1: Japanese Patent Application Laid-Open No. 2011-114949

SUMMARY OF THE INVENTION

Problems to be Solved by the Invention

The inventor of the present application proposes an energy collection device capable of obtaining larger reception power by taking in electric field energy of a quasi-electrostatic field (near field) in addition to radio waves existing in a wide range with a configuration different from conventional one of converting energy of radio waves using a reception antenna into power. It is desired to further increase the output of such an energy collection device.

Moreover, the present technology enables reception of radio waves having a specific frequency for power transmission such as WPT. Therefore, the diode of the rectifier circuit used for this needs to rectify a leakage electric field from a power supply such as 50/60 Hz or switching noise such as 50 kHz, 120 kHz, or the like at a low frequency, and also a radio wave of several GHz together at a high frequency. The present technology relates to a rectifier circuit that efficiently rectifies electric field energy in such a wide frequency band without requiring a connection switching circuit as described in Patent Literature 1.

An object of the present technology is to provide an energy collection device and a rectifier circuit capable of increasing output and extracting power from radio waves in a wide frequency band.

Solutions to Problems

The present technology provides an energy collection device that includes: an antenna unit having a dipole structure, the antenna unit including a first antenna element that is in contact with an industrial product metal portion or a human body and functions as an antenna, and a second antenna element including a conductor, the antenna unit receiving electric field energy of a radio wave and a quasi-electrostatic field existing in space;

a rectifier circuit provided with a switching element that rectifies alternating current (AC) energy output from the antenna unit; and a power storage capacitor configured to store charge output from the rectifier circuit, in which the power storage capacitor has a capacitance value of at least 1 μF or more in order to receive power in a low frequency band.

The present technology also provides a rectifier circuit provided with a switching element that rectifies energy of AC energy output from an antenna unit having a dipole structure, the antenna unit including a first antenna element that is in contact with an industrial product metal portion or a human body and functions as an antenna, and a second antenna element including a conductor, the antenna unit receiving electric field energy of a radio wave and a quasi-electrostatic field existing in space, in which a matching circuit is provided between the antenna unit and the switching element, the matching circuit has a configuration of a low-pass filter that makes matching at a specific frequency of 100 MHz or more, and the rectifier circuit is configured to receive electric field energy of both a frequency band of 100 MHz or less and the specific frequency band.

BRIEF DESCRIPTION OF DRAWINGS

FIG. 11 is a schematic diagram for explaining a modification of the first example.

FIG. 12 is a schematic diagram for explaining a second example of the energy collection device including the device board.

FIG. 13 is a schematic diagram for explaining a modification of the second example.

FIG. 14 is a connection diagram for explaining a modification of the energy collection device.

FIG. 16 is a connection diagram for explaining a modification of the energy collection device.

MODE FOR CARRYING OUT THE INVENTION

Figure 1:
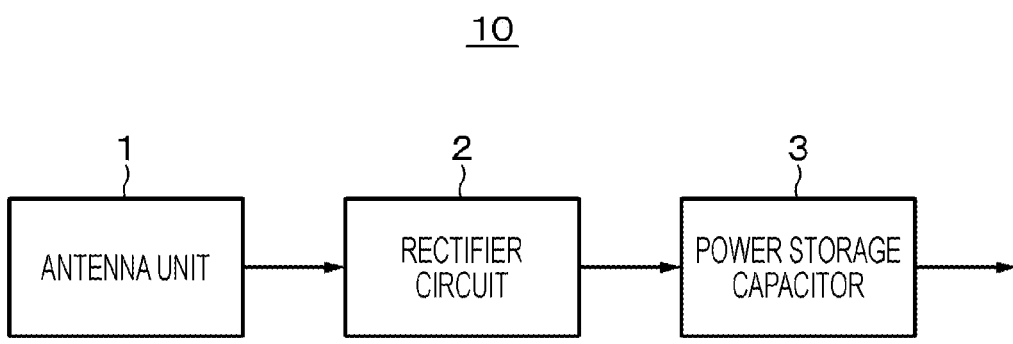
FIG. 1 is a block diagram of a first embodiment of an energy collection device.

The embodiments described below are preferred specific examples of the present technology, and various technically preferable limitations are given. However, the scope of the present technology is not limited to these embodiments unless there is a description to limit the present technology in the following description. Furthermore, in the following description, the same names and reference numerals indicate the same or similar constituent elements, and redundant description will be omitted as appropriate.

FIG. 1 is a block diagram of an energy collection device (hereinafter, appropriately referred to as a harvester) 10 according to a first embodiment of the present technology. The harvester 10 is a device that extracts electric field energy existing in space from a metal or a human body and outputs the energy as power.

The harvester 10 includes an antenna unit 1, a rectifier circuit 2, and a power storage capacitor 3. A load is connected to the power storage capacitor 3. The antenna unit 1 functions as a reception antenna for receiving power via metal or a human body. For example, the antenna unit 1 receives electric field energy of a radio wave or a quasi-electrostatic field in space as power. The quasi-electrostatic field is a voltage phenomenon that does not have a property of propagating like a radiated electromagnetic field, a what is called radio wave, and is distributed like electrostatic charging in the vicinity of a person, a vehicle, or a substance. The electrostatic field is regarded as having no time change, whereas the quasi-electrostatic field has a frequency component and has a time change.

Electric field energy is induced in a metal portion (iron, aluminum, copper, metal alloy, or the like) of an industrial product, a vehicle, a vending machine, a refrigerator, a microwave oven, a metal rack, a guardrail, a mail post, a traffic light, or the like existing in the vicinity. By using such an industrial product metal portion as an antenna, it is possible to receive electric field energy of radio waves and the quasi-electrostatic field (near field) in space. That is, when a metal is present in a state of floating in space, various AC power (AC current) flows on the metal surface. Therefore, this metal is regarded as an antenna, and this power can be efficiently converted into energy. Note that the industrial product metal portion is a metal portion other than an industrial product designed as an antenna.

The rectifier circuit 2 rectifies the output signal of the antenna unit 1 with a diode having a very small reverse current with respect to the forward current. As a result, in addition to radio waves, it is possible to efficiently receive power of a quasi-electrostatic field (near field) such as 50/60 Hz leaking from a very small power supply as a frequency. As the rectifier circuit 2, any one of a half-wave rectifier circuit, a full-wave rectifier circuit, a voltage doubler circuit, a Cockcroft-Walton circuit, and the like may be used.

The power storage capacitor 3 reduces a ripple of the output of the rectifier circuit 2 to generate power, and supplies the generated power to a load. The load is a circuit or an element driven by the power stored in the power storage capacitor 3. For example, a control unit such as a microcomputer, a communication unit, various sensors, and the like are used as loads.

Figure 2A:
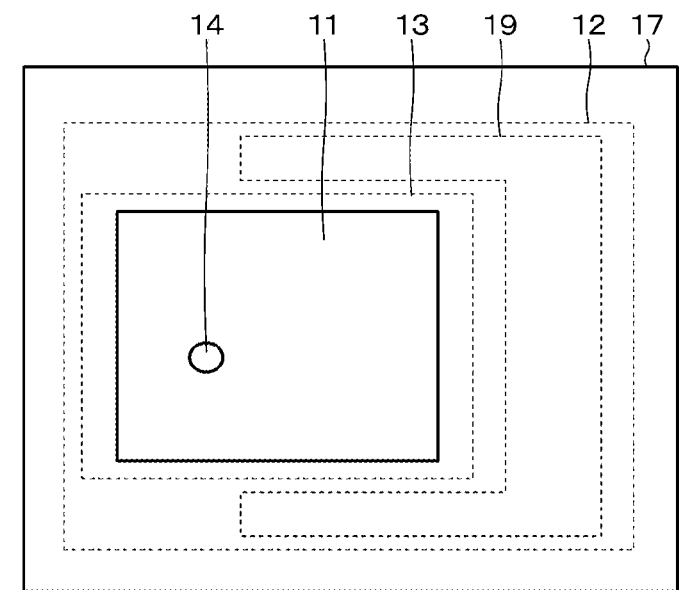
FIGS. 2A, 2B, and 2C are a plan view and a cross-sectional view of an example of the energy collection device.

The antenna unit 1 includes a first antenna element that is in contact with a metal and a second antenna element. An example of the harvester 10 including the antenna unit 1 will be described with reference to FIG. 2A (plan view), FIG. 2B (cross-sectional view), FIG. 2C (cross-sectional view), FIG. 3A (plan view), and FIG. 3B (cross-sectional view), and a board view on which the rectifier circuit 2 and the power storage capacitor 3 are mounted.

As illustrated in FIGS. 2A, 2B, 2C, 3A, and 3B, a first antenna element 11 that is in contact with or connected to the industrial product metal portion is configured in a plate shape (patch shape). The antenna element 11 has a plate shape including a conductor such as gold, silver, aluminum, copper, iron, nickel, an alloy, or the like. The contact surface of the antenna element 11 with metal may be coated with resin. The antenna element 11 has a shape such as a linear shape, a pin shape, a hemispherical shape, or an uneven shape in accordance with the shape of the industrial product metal portion. The industrial product metal portion and the antenna element 11 are brought into contact with or connected to each other by a method such as welding, mechanical coupling (caulking or the like), adhering with a conductive adhesive, or bonding to an iron material or the like using magnetism of a magnet or the like.

Furthermore, as the antenna element 11, for example, a conductive resin, a conductive rubber, or the like in which carbon, metal, or the like is blended may be used. By using the conductive resin, for example, electrodes of various shapes can be easily formed. Furthermore, by using the conductive rubber, an electrode that can be elastically deformed, an electrode having high adhesion, and the like can be configured. In addition, the material of the antenna element 11 is not limited, and the materials described above may be used alone, or the electrodes may be configured by combining the respective materials.

Figure 2B:
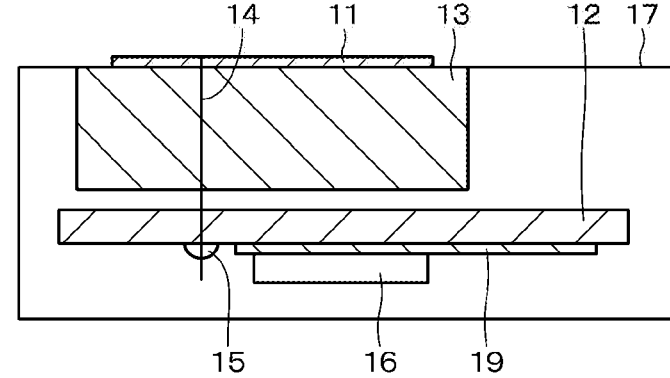
Figure 2C:
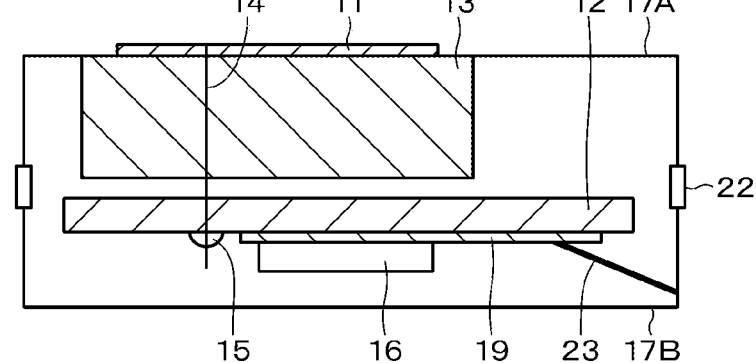

In FIGS. 2B and 2C, for example, the plate-shape (patch-shape) antenna element 11 and a device board (circuit board) 12 are disposed to face each other, and a dielectric plate 13 is interposed between the antenna element 11 and the device board 12. The space between the antenna element 11 and the device board 12 may be formed without providing the dielectric plate 13. The rectifier circuit 2 and the power storage capacitor 3 are mounted on the device board 12.

In order to electrically connect the antenna element 11 and the device board 12, the antenna element 11 and one end of a conductive pin 14 are electrically connected, and the other end of the conductive pin 14 penetrates the device board 12 and is soldered to a signal path electrode on the back surface of the device board 12. The antenna element 11 and a ground including a copper foil pattern of the device board 12 constitute the antenna unit 1. The ground is the second antenna element. The antenna unit 1 has a structure of a T-type antenna using a flat plate as an antenna element. A connection portion between the signal path electrode of the device board 12 and the conductive pin 14 serves as a feeding point 15 of the antenna. A circuit unit 16 is provided on, for example, the back surface of the device board 12.

The harvester 10 having the above-described configuration is housed in a case 17. The contact surface of the case 17 other than the antenna element 11 includes an insulating material such as resin. Furthermore, a case side surface, a case opposite surface, and the like other than the contact surface with the metal that is intended to take in energy also include an insulating material.

FIG. 2C illustrates a configuration in which the case 17 includes a case 17A including a non-metal such as resin or the like and a case 17B including a metal. A ground 19 on either the upper or lower surface of the device board 12 and the case 17B may be electrically connected to each other. That is, the case 17A including an insulating material on which the antenna element 11 is provided and the case 17B including a metal material constituting the opposite surface may be connected by a connection unit 22 such as a screw, and the case 17B and the ground 19 of the device board 12 may be connected by a wire 23.

Figure 3A:
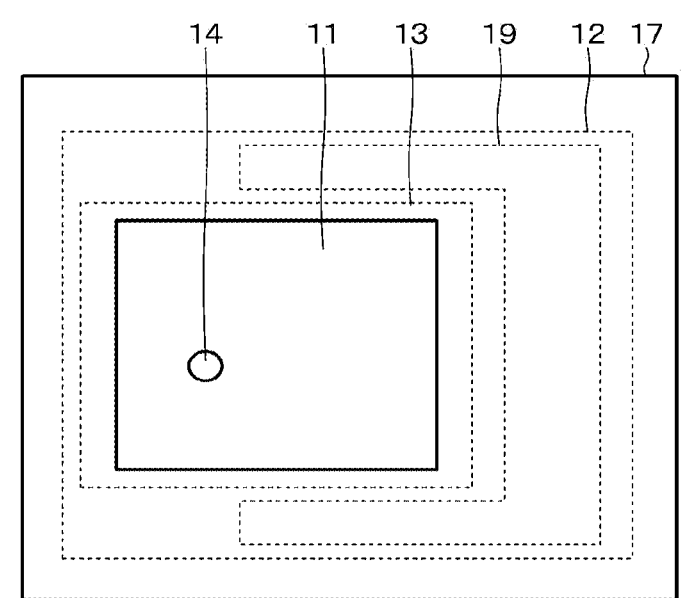
FIGS. 3A and 3B are a plan view and a cross-sectional view of another example of the energy collection device.
Figure 3B:
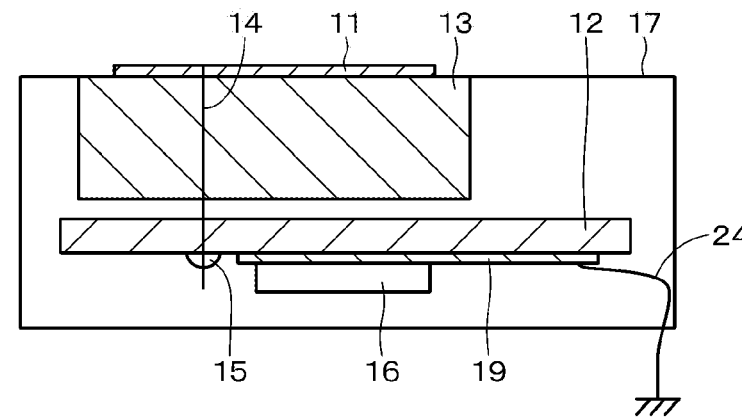

Furthermore, as illustrated in FIGS. 3A and 3B, an insulated covered cable 24 may be further connected to the ground 19 including a copper foil pattern of the device board 12 by solder or the like to be grounded to the earth ground. The antenna element 11 described above is formed in a plate shape, and is configured to be in contact with or connected to the industrial product metal portion. However, the antenna element 11 and the feeding point 15 can be directly connected to each other using an insulated covered cable or the like with respect to the industrial product metal portion.

There is a great deal of electric field energy around us, which can be divided into low frequency components and high frequency components. For example, a leakage electric field (50 Hz/60 Hz) from a home AC power supply, noise present in the vicinity of a personal computer, a voltage generated when a person walks, and the like are low frequency components. These are referred to as quasi-electrostatic fields (near field). On the other hand, radio broadcasting (AM/FM), television broadcasting, mobile phone radio waves, WPT radio waves, and the like are high frequency components. These are referred to as radio waves (far field).

Figure 4:
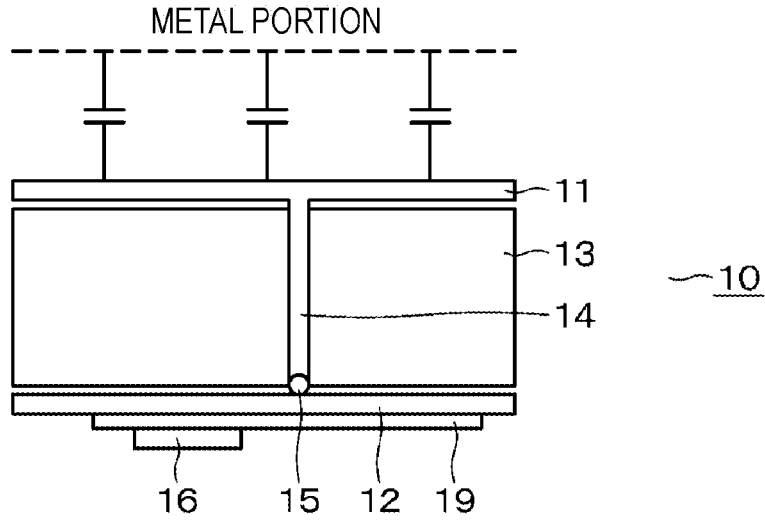
FIG. 4 is a schematic diagram for explaining an operation of the energy collection device.

As illustrated in FIG. 4, the antenna element 11 of the antenna unit 1 described above is brought into contact with the industrial product metal portion. The antenna element 11 is attached to the industrial product metal portion. By using the industrial product metal portion as an antenna, the antenna unit 1 can take in energy of both a quasi-electrostatic field such as noise, which is a leakage current, and a radio wave such as a broadcast wave.

As the antenna unit 1, it is preferable that the antenna element 11 is directly connected to the industrial product metal portion, but in the above described example, the antenna element 11 is basically in surface contact to increase the capacitance. It is sufficient that it is in contact with or connected to the metal portion. In the case of contacting, it may be fitted in a pin structure, a hemispherical shape, or an uneven shape other than a planar shape. In the case of connecting, it may be connected directly by screwing, soldering, welding, or the like or via an insulator (or air) such as an insulating covered cable or conductive rubber. The antenna unit 1 including the antenna element 11 in contact with the metal and the ground electrode 19 of the device board 12, or the separate second antenna element can receive electric field energy to generate power. Note that it is sufficient that the antenna element 11 can be capacitively coupled with a metal even if a space or an insulator is interposed.

In the example described above, the first antenna element 11 and the second antenna element 19 constitute the antenna unit 1. The first antenna element 11 is a conductor that is connected to or in contact with metal. The second antenna element 19 is a conductor different from the first antenna element 11, and is a conductor that is not connected to or in contact with metal.

The antenna unit 1 is an antenna having a dipole structure including the first antenna element 11 and the second antenna element 19. In the present disclosure, the antenna having the dipole structure is an antenna having a structure for transmitting and receiving an electric field using two antenna elements. Since the electric field is an AC wave, there are always high and low voltages at any frequency on the conductor on which the electric field acts.

In general, the length of a conductor serving as the antenna element is set to a length corresponding to the wavelength of a frequency desired to be received. In the antenna having the dipole structure, the length of each antenna element is typically adjusted to a length of ¼ of the wavelength of the frequency desired to be received. In this case, since the high and low voltages induced at the frequency desired to be received coincide with each other, the obtained power is maximized. In this structure, the sum of the length of each antenna element is ½ of the wavelength. This is a what is called half-wavelength dipole antenna.

The metal to which the first antenna element 11 of the antenna unit 1 is connected or in contact is insulated from the ground (GND) (in a floating state). Therefore, the metal functions as an antenna element on one side via the first antenna element 11.

As described above, on the conductor on which the electric field acts, there are always high and low voltages regardless of the frequency of the electric field. Therefore, when an electric field acts on the two antenna elements (the first antenna element 11 and the second antenna element 19), a current always flows through the two antenna elements. Although the current flowing through each antenna element is not necessarily the maximum current that can be extracted from the electric field, in any case, the current (energy of the electric field) can be extracted from each antenna element. The antenna unit 1 uses this effect to receive the energy of the electric field.

Note that the configuration example of the antenna unit 1 in the present disclosure also includes a configuration in which the second antenna element 19 is connected to the ground (GND) using a cable. Such a configuration may be generally referred to as a monopole antenna. On the other hand, in the present configuration, the antenna unit 1 is connected to the ground (GND) via the second antenna element 19, and there is no change in the configuration in which the electric field is received using the two antenna elements of the first antenna element 11 and the second antenna element 19. In this sense, the configuration in which the second antenna element 19 is connected to the ground (GND) as described above can also be said to be the dipole structure in the present disclosure.

The present technology is not limited to the above-described industrial product metal portion, and the first antenna element of the antenna unit of the harvester may be brought into contact with a human body. The antenna element of the harvester is attached to a part of the human body, for example, an arm. Since the human body is used as an antenna, the antenna unit of the harvester can take in energy of both a quasi-electrostatic field such as noise, which is a leakage current, and a radio wave such as a broadcast wave. The antenna unit that is in contact with the human body has a configuration similar to the antenna unit 1, which is in contact with or connected to the industrial product metal portion.

The human body and the first antenna element are electrically in contact with each other by capacitive coupling. Although it is preferable that the antenna element is in direct contact with the human body, it is basically preferable that the antenna element is in surface contact so as to increase the capacitance. However, the present invention is not limited to surface, and may have a pin structure, a hemispherical structure, or a structure in which fitting is performed with unevenness in addition to a planar shape as long as the antenna element is in contact with the human body. The antenna unit including the antenna element in contact with the human body and the ground electrode of the device board can receive electric field energy to generate power. The antenna unit can receive a low frequency quasi-electrostatic field. The reason why the antenna unit resonates at a low frequency such as 50 Hz, for example, is considered that the blood vessel appears as an antenna. In this manner, the antenna unit can receive radio waves in a wide frequency range. Therefore, the electric field energy can be taken in without being restricted by the place where the person wearing the antenna device according to the present technology is present.

Figure 5:
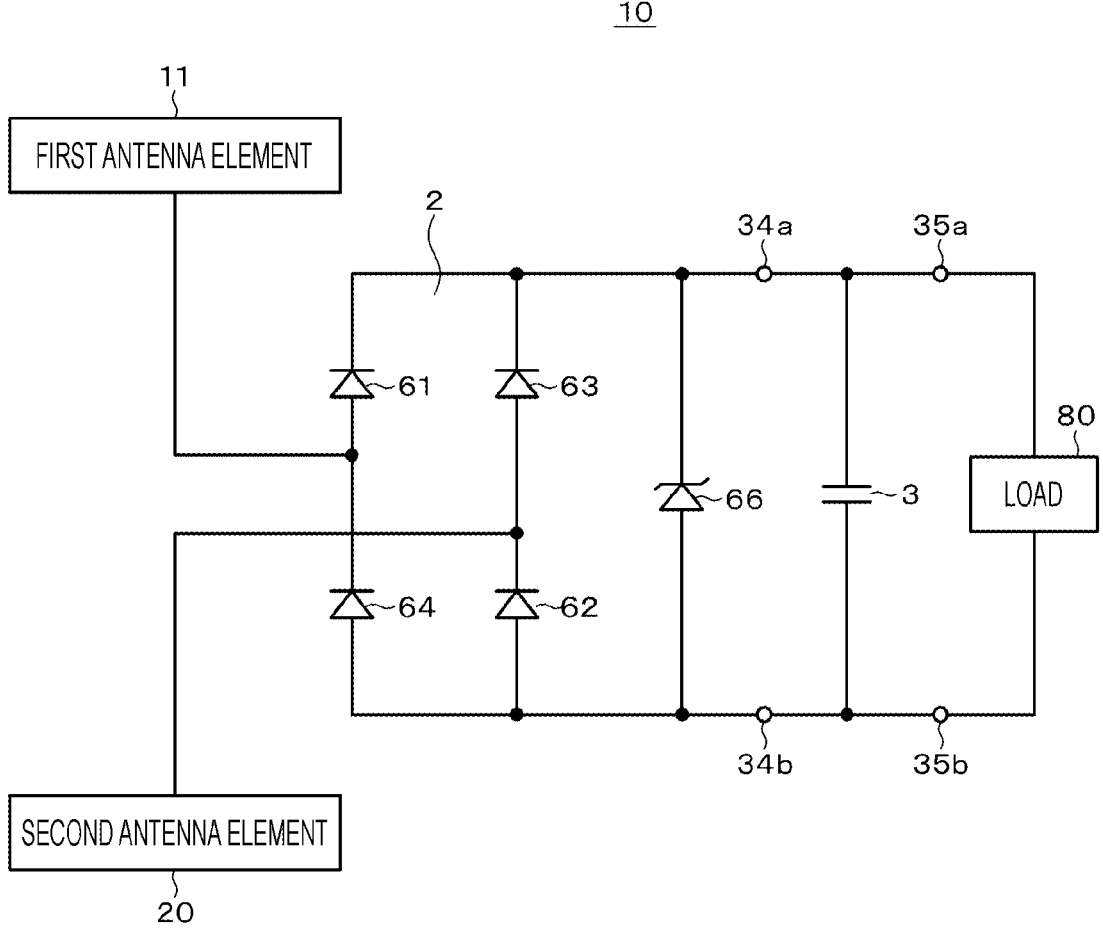
FIG. 5 is a connection diagram of an example of a configuration of the energy collection device.

An example of specific connection of the first embodiment of the present technology is illustrated in FIG. 5. Note that, In the following description, the harvester 10 in which the antenna element is coupled to the industrial product metal portion will be described, and the same applies to a rectifier circuit of the harvester in which the first antenna element is coupled to the human body. In the case of handling a small voltage such as energy harvesting, rectification can be performed by a normal rectifier circuit, but a certain level of voltage is required in order to store energy quickly. Furthermore, in terms of efficiency, since the full-wave rectifier circuit can increase the voltage of the AC signal and take in all, the full-wave rectifier is used in the diode adopted for rectification this time even if the loss of the diode is included. However, as the rectifier circuit 2, any one of a half-wave rectifier circuit, a full-wave rectifier circuit, a voltage doubler circuit, a Cockcroft-Walton circuit, and the like may be used.

In the rectifier circuit 2, it is important that a leakage current of the diode at the time of reverse bias is very small. In a case where there is a leakage current, the full-wave rectifier circuit is suitable. As illustrated in FIG. 5, diodes 61 and 64 are connected in series, and diodes 63 and 62 are connected in series. A connection point of the anode of the diode 61 and the cathode of the diode 64 is connected to the first antenna element 11, and a connection point of the anode of the diode 63 and the cathode of the diode 62 is connected to the second antenna element 19 or 20.

A connection point of the cathode of the diode 61 and the cathode of the diode 63 are connected to one output terminal 34a, and a connection point of the anode of the diode 64 and the anode connection point of the diode 62 are connected to the other output terminal 34b. An electrostatic countermeasure varistor 66 (for example, a Zener diode) is connected in parallel between the output terminals 34a and 34b. The power storage capacitor 3 is connected in parallel between the output terminals 34a and 34b. Output terminals 35a and 35b are led out from both ends of the power storage capacitor 3, and a load 80 is connected between the output terminals 35a and 35b.

Figure 6:
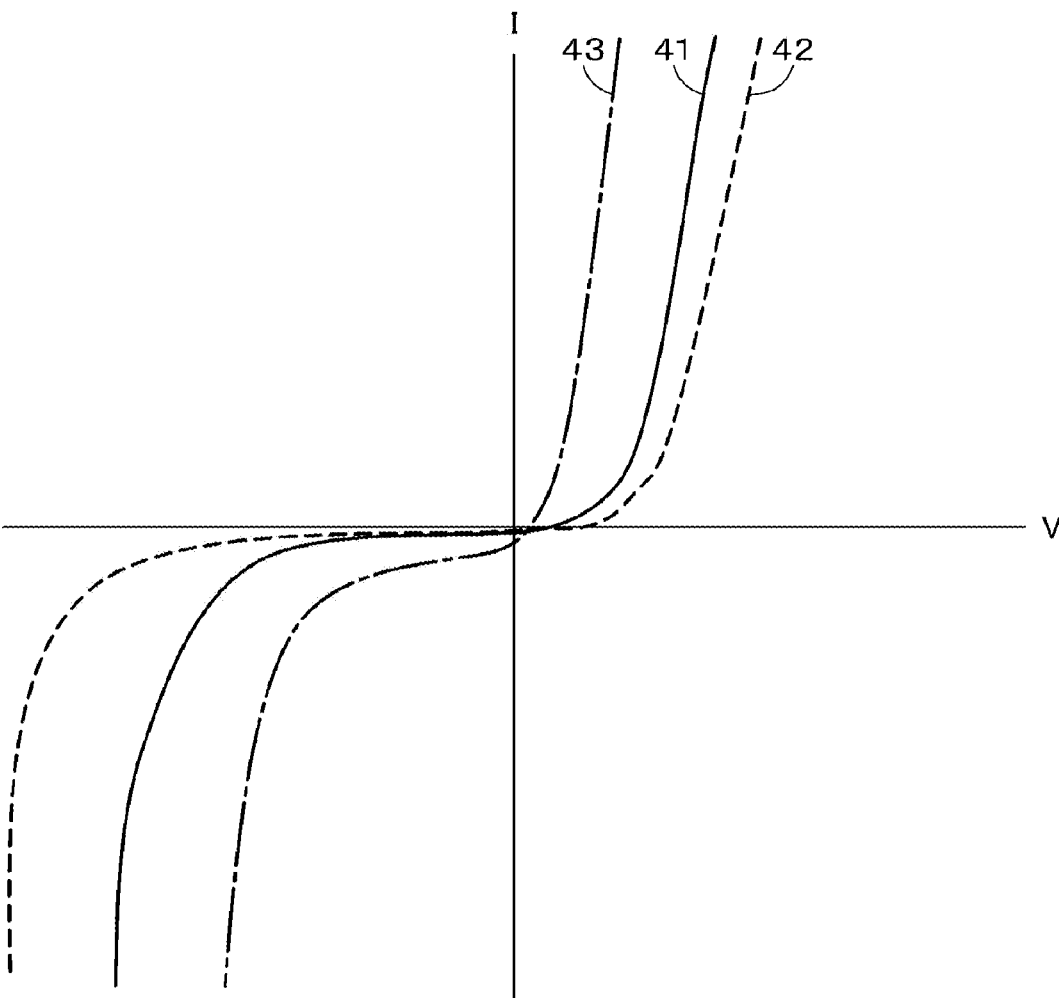
FIG. 6 is a graph for explaining characteristics of a diode of a rectifier circuit.

Note that, although the circuit is configured by a discrete diode, it may be configured by a dedicated IC. FIG. 6 and Table 1 illustrates results of measurement of the forward voltage Vf and the reverse current Is of the diode used in the rectifier circuit 2. The diode product number 1N60 has been measured using silicon and germanium products, and the other product number ISS108 has been evaluated using germanium products manufactured by different manufacturers. In FIG. 6, a curve 42 is a characteristic of 1N60 (silicon), a curve 41 is a characteristic of 1N60 (germanium), and a curve 43 is a characteristic of ISS108 (germanium).

TABLE 1

| | Room temperature | | |
| --- | --- | --- | --- |
| | Forward voltage Vf [mV] | Reverse current Is [μA] | Rectification by metal antenna |
| 1N60 (silicon) | 367 | 1 | ◯ |
| 1N60 (germanium) | 303 | 7 | X |
| 1SS108 | 162 | 26 | X |

A current flowing when a voltage is applied in the reverse direction of the diode is the reverse current Is. The measurement data in Table 1 is data when 10 V is applied in the reverse direction of the diode. The forward voltage Vf is a voltage at which a forward current (1 mA) starts to flow through the diode.

In a case where the output of the antenna unit 1 described above is rectified, it has been found that the diode 1N60 (silicon) in which the current does not flow in the reverse direction can take in power more than the diode in which the voltage at which the current starts to flow in the forward direction is low. The rectified input is AC, and the data in Table. 1 is data when 10 V is applied. Therefore, when the same voltage as Vf, which is the forward voltage of the diode, is applied in the reverse direction, the reverse current Is is calculated to be 0.036 μA for 1N60 (silicon), 0.21 μA for 1N60 (germanium), and 0.5 μA for ISS108 (germanium) from the data. Therefore, the ratio of the reverse current Is at the forward current (1 mA)/forward voltage Vf is calculated to be 1/27778 for 1N60 (silicon), 1/4762 for 1N60 (germanium), and 1/2000 for ISS108 (germanium). That is, as the diode used in the rectifier circuit 2, the above-described ratio needs to be larger than approximately 4700 times, and preferably, the above-described ratio is 10000 or more. As a result, among the three diodes mentioned as examples, 1N60 (silicon) has the most suitable characteristics.

Moreover, considering the characteristics of the diode, the reverse current Is when a voltage is applied in the reverse direction is preferably small, and the reverse resistance value is calculated to be 100 MΩ for 1N60 (silicon), 1.43 MΩ for 1N60 (germanium), and 0.38 MΩ for ISS108 (germanium) using the data of in 10 V. That is, the resistance value for preventing the current from flowing in the reverse direction is preferably large, and as the diode used in the rectifier circuit 2, the above-described resistance value needs to be larger than 1.43 MΩ, and is preferably 10 MΩ or more. As a result, among the three diodes mentioned as examples, 1N60 (silicon) has the most suitable characteristics.

Figure 7A:
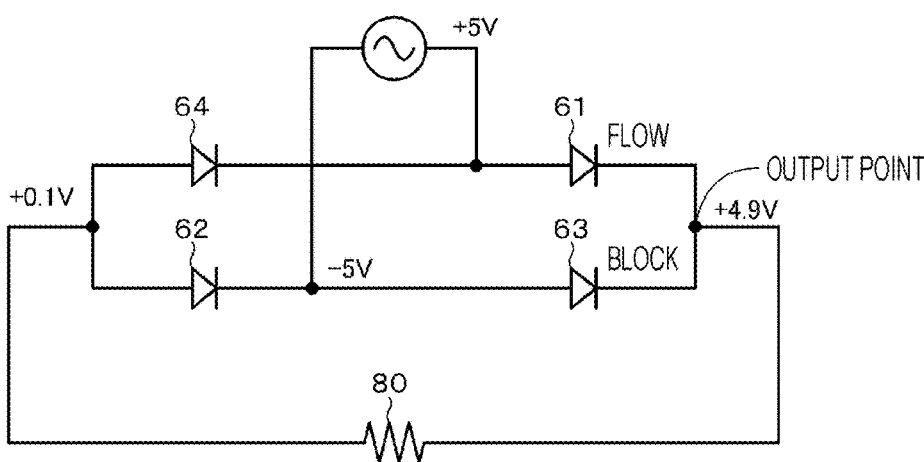
FIGS. 7A and 7B are connection diagrams for explaining the operation of the rectifier circuit.
Figure 7B:
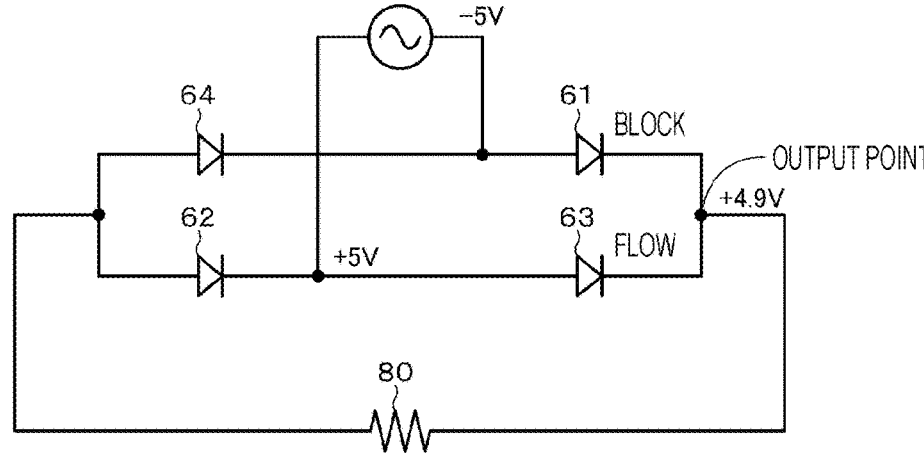

The operation of the full-wave rectifier circuit described above will be described. In the present technology, as described with reference to FIG. 5, the full-wave rectifier circuit is used as the rectifier circuit connected to the antenna device from the viewpoint of effective use of energy. As illustrated in FIGS. 7A and 7B, the full-wave rectifier circuit uses the four diodes 61 to 64, in which a series circuit of the diodes 61 and 64 and a series circuit of the diodes 62 and 63 are connected in parallel, and AC is applied between the series circuits to be converted into DC. The load 80 is connected to an output point of the full-wave rectifier circuit. Note that, when the current passes through the diode, a voltage drop occurs according to the flowing current, so that the output voltage at the output point is, for example, 4.9 V decreased by 0.1 V.

Figure 8A:
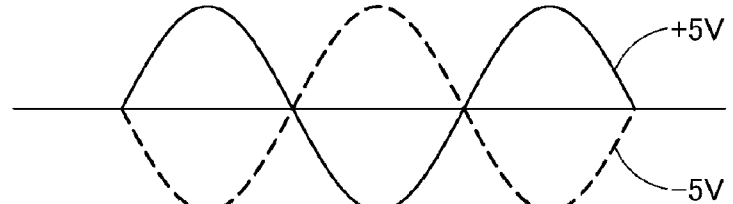
FIGS. 8A and 8B are timing charts for explaining the operation of the rectifier circuit.
Figure 8B:
Figures 9A, 9B, 9C, 9D:
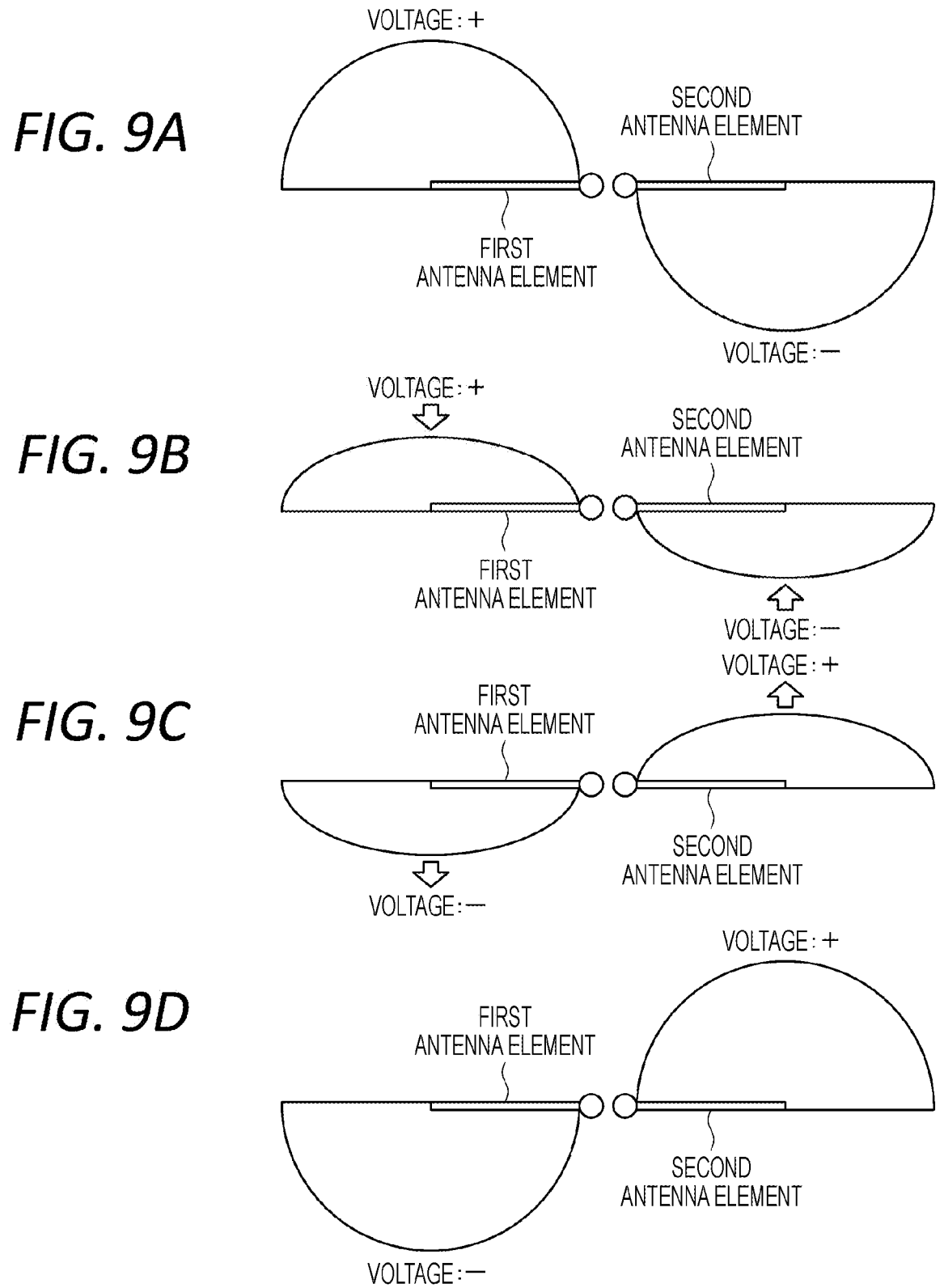
FIGS. 9A to 9D are schematic diagrams for explaining induction of energy received from an antenna.

FIG. 7A illustrates a half cycle in which a current flows through the diodes 61 and 62, and the diodes 63 and 64 block the current in a period when the input AC power supply is positive. FIG. 7B illustrates a half cycle in which a current flows through the diodes 63 and 64, and the diodes 61 and 62 block the current in a period when the input AC power supply is negative. Therefore, the output illustrated in FIG. 8B is generated from the AC power supply illustrated in FIG. 8A. In FIG. 8A, the solid line is +5.0, and the dotted line is −5.0 V. FIG. 8B illustrates waveforms at the output points of FIGS. 7A and 7B.

As schematically illustrated in FIGS. 9A to 9D, a voltage is induced between the diodes 61 and 64 and the diodes 62 and 63 by the energy received from the antenna, and the voltage changes according to the frequency. That is, when a positive potential is applied to the first antenna element, a negative potential is applied to the second antenna element.

Since only the larger potential passes through the diode, in this example, only the positive potential of 5 V passes through the diode according to the frequency. These are added together in accordance with the frequency to form DC. At this time, since the frequency component is still left and there is also a ripple, the charge is once stored in the power storage capacitor 3 and then converted into clean DC.

Figure 10:
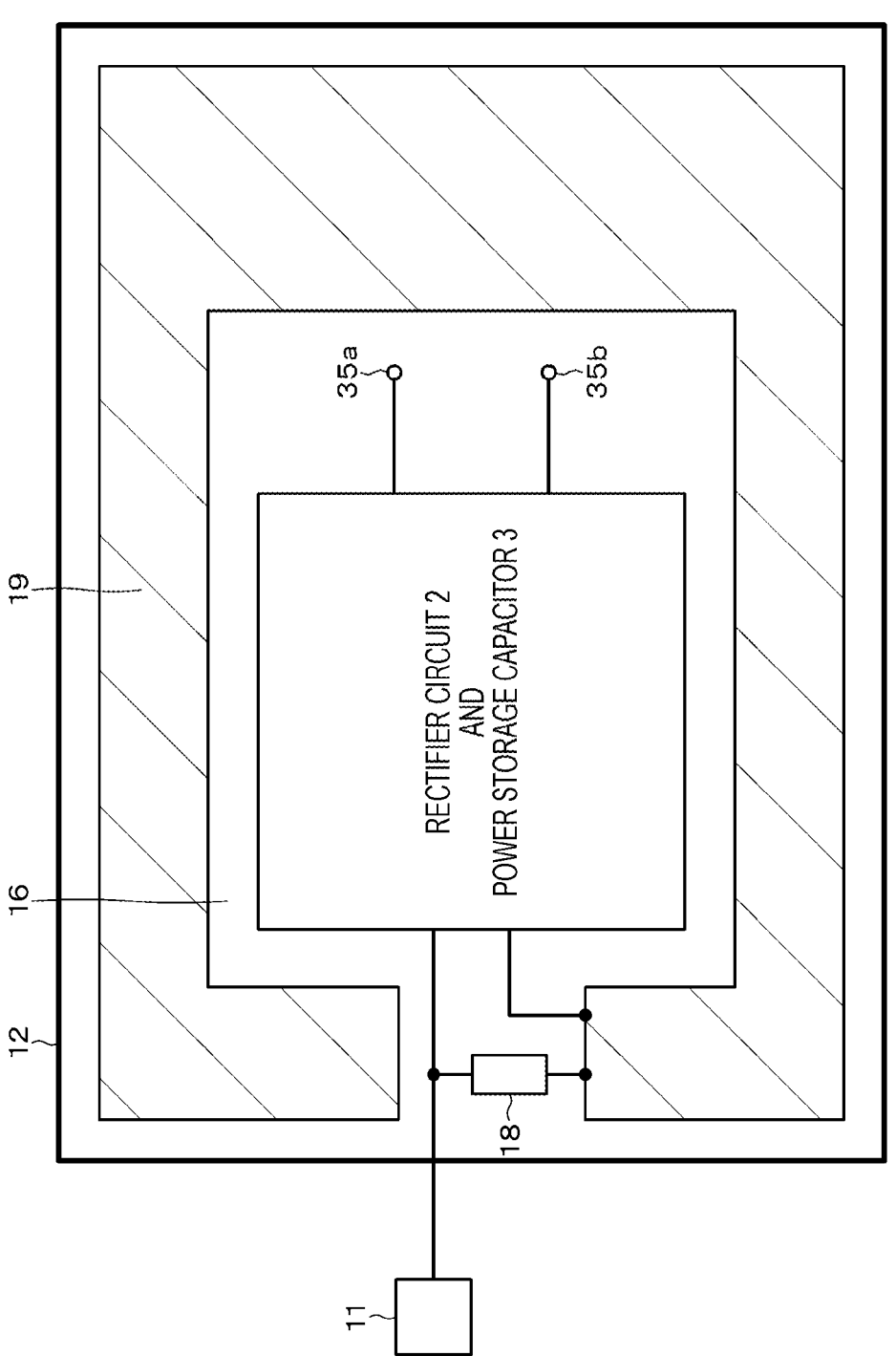
FIG. 10 is a schematic diagram for explaining a first example of an energy collection device including a device board.

Note that, in the present technology, energy having not one frequency but various frequency components is present in an overlapping manner, and thus there is not only a case of one type of frequency but also a case where a high voltage and a low voltage are alternately generated depending on the overlapping of the respective frequencies. However, for simplification of description and illustration, in the drawings, the waveforms are represented as schematic positive and negative waveforms similar to sine waves. For example, the positive voltage value is +5 V, and the negative voltage value is −5 V As illustrated in FIG. 10, the ground 19 including the copper foil pattern is formed on the device board 12 included in the harvester 10, and the first antenna element 11 and the ground 19 including the copper foil pattern of the device board 12 constitute the antenna unit 1. The ground 19 is the second antenna element. Furthermore, in a case where an electrostatic countermeasure is required, an electrostatic protection component, for example, a varistor 18 is inserted between the antenna element 11 in contact with or connected to a metal (or human body, the same applies hereinafter) and the ground including the copper foil pattern of the reception device. Note that the varistor 18 may be connected between the output terminal 35*a* and the ground 19.

The circuit unit 16 includes the rectifier circuit 2 and the power storage capacitor 3. An output voltage is taken out to the output terminals 35*a* and 35*b* of the circuit unit 16. The rectifier circuit 2 and the power storage capacitor 3 does not overlap the ground 19 including the copper foil pattern of the device board 12. In the first embodiment, an input line output from the antenna element 11 to the rectifier circuit 2 is connected in series to the rectifier circuit without interposing a matching circuit. Note that the circuit unit 16 may be provided separately without providing the power storage capacitor 3.

Figure 11:
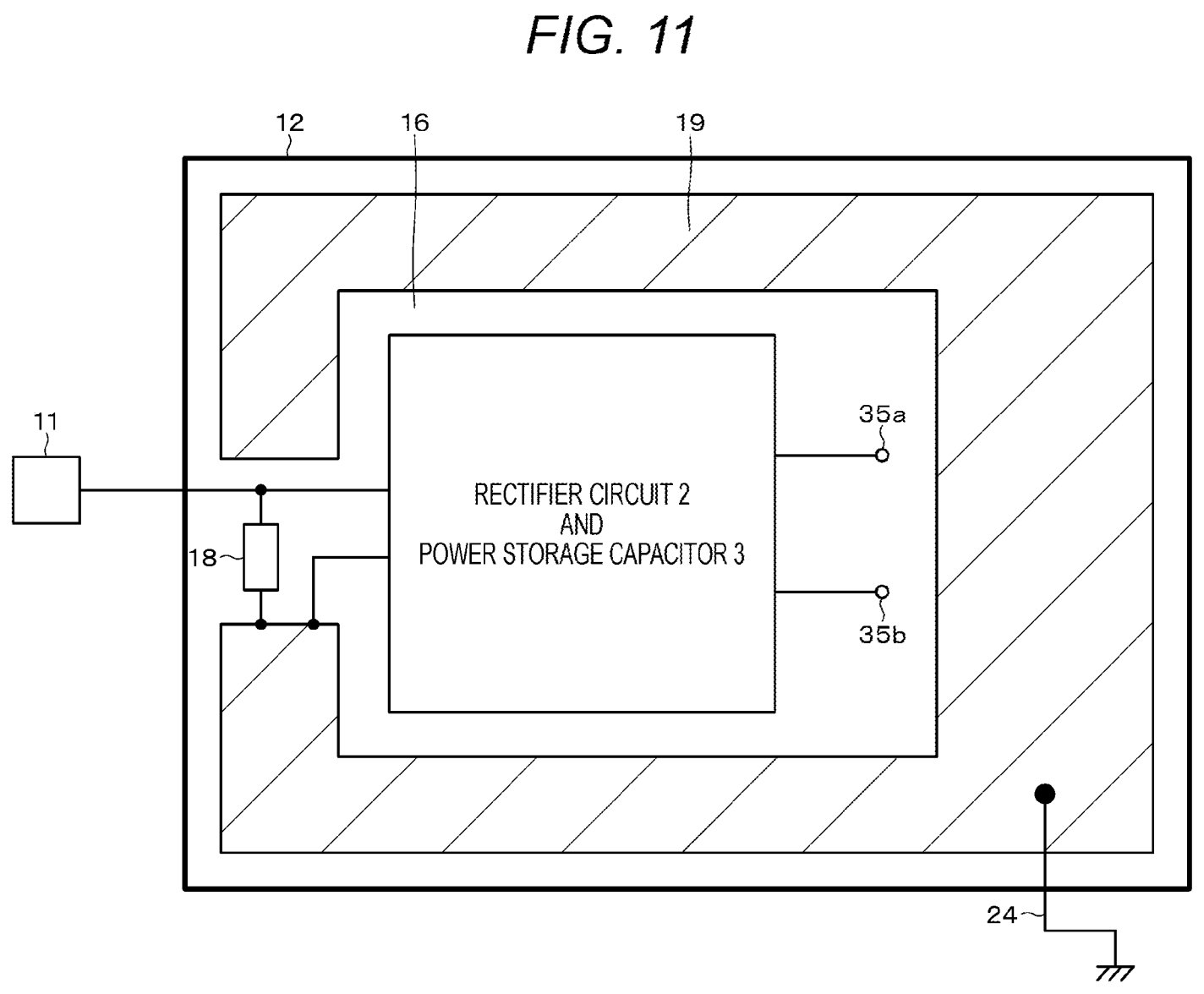

FIG. 11 illustrates a configuration of the device board 12 corresponding to FIGS. 3A and 3B. The ground 19 (indicated as a shaded region) including the copper foil pattern of the device board 12 is grounded to the earth ground via the insulated covered cable 24. The earth ground may function as a low potential ground such as a wide conductive plate including the earth. Note that the varistor 18 may be connected between the output terminal 35*a* and the ground 19.

Figure 12:
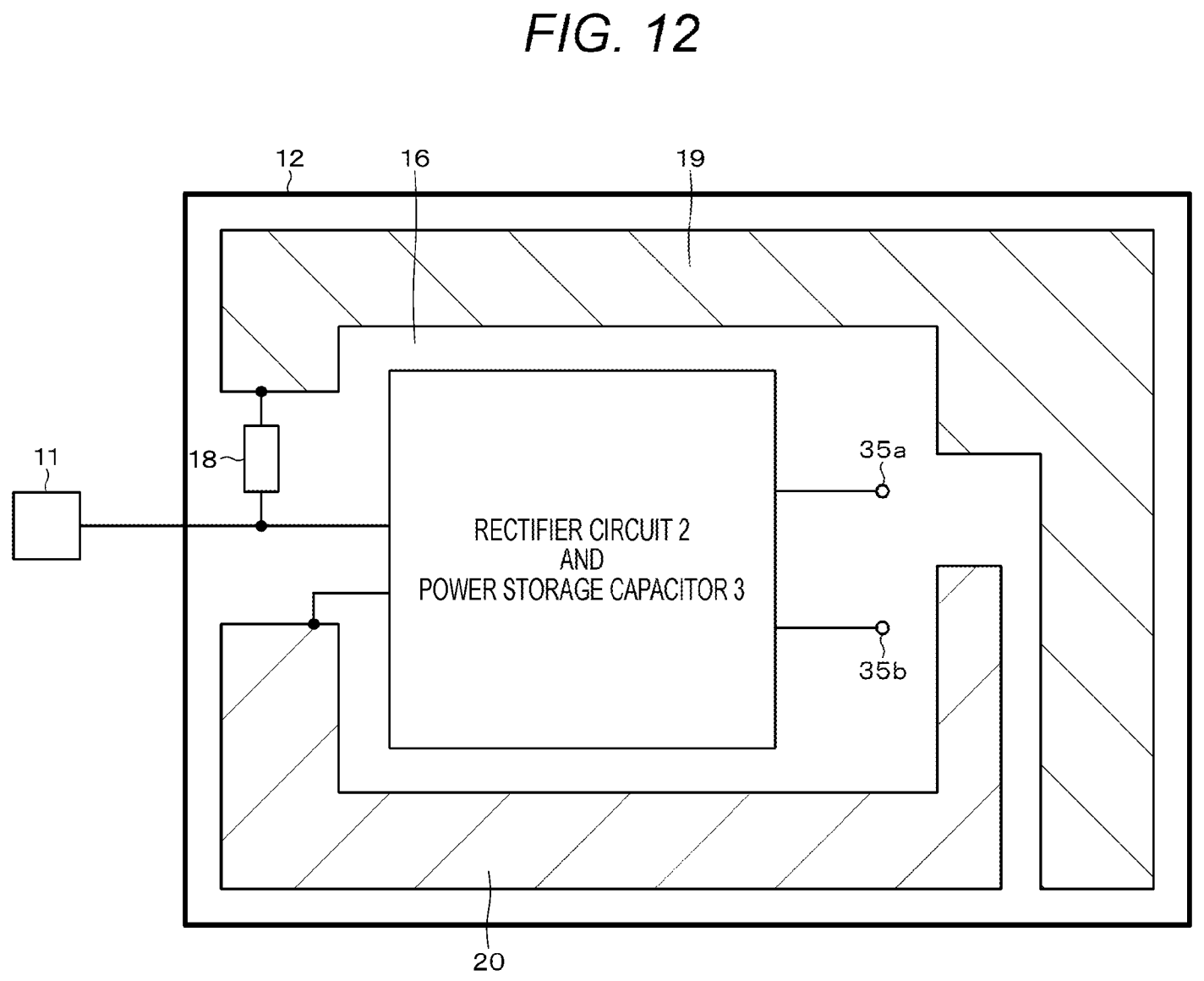
Figure 13:
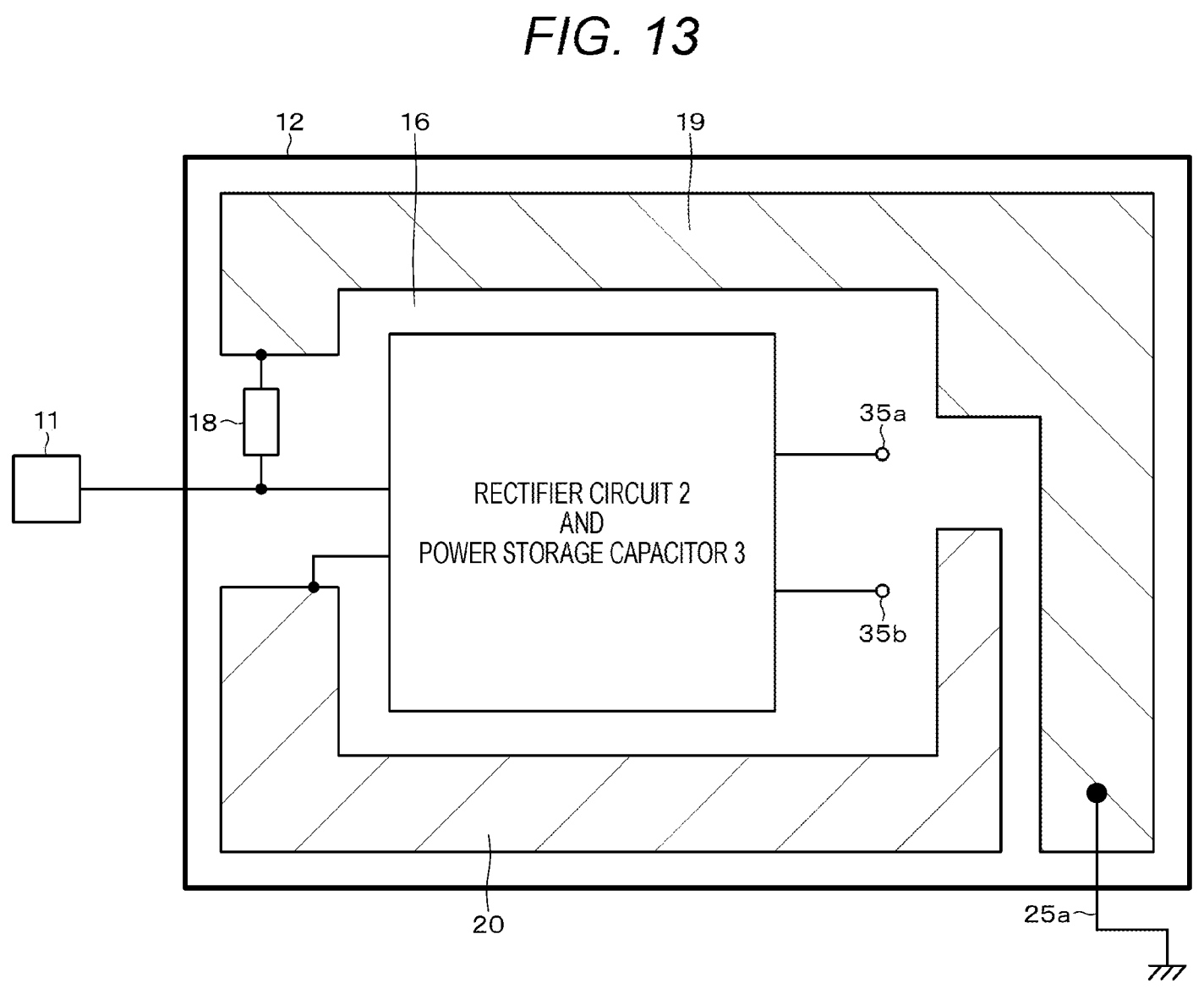

Next, as illustrated in FIG. 12, a separate second antenna element 20 (illustrated as a shaded region) including a copper foil pattern may be configured on the board described above. In this case, it is necessary to prevent the separate second antenna element 20 from coming into contact with or being connected to the industrial product metal portion that is intended to take in energy. Furthermore, as illustrated in FIG. 13, an insulated covered cable 25*a* may be further connected to the ground 19 (indicated as a shaded region) including the copper foil pattern of the device board 12 to be grounded to the earth ground. Furthermore, in FIGS. 12 and 13, the second antenna element 20 is formed on a separate board, but it may be formed on a metal portion such as a housing configured not to come into contact with the metal on the side opposite to the metal contact surface of the receiver. Also in this case, as an electrostatic countermeasure, an electrostatic protection component such as a varistor 18, for example, can be inserted between the antenna element 11 in contact with the metal and the ground of the reception device. Note that the varistor 18 may be connected between the output terminal 35*a* and the ground 19.

Figure 14:
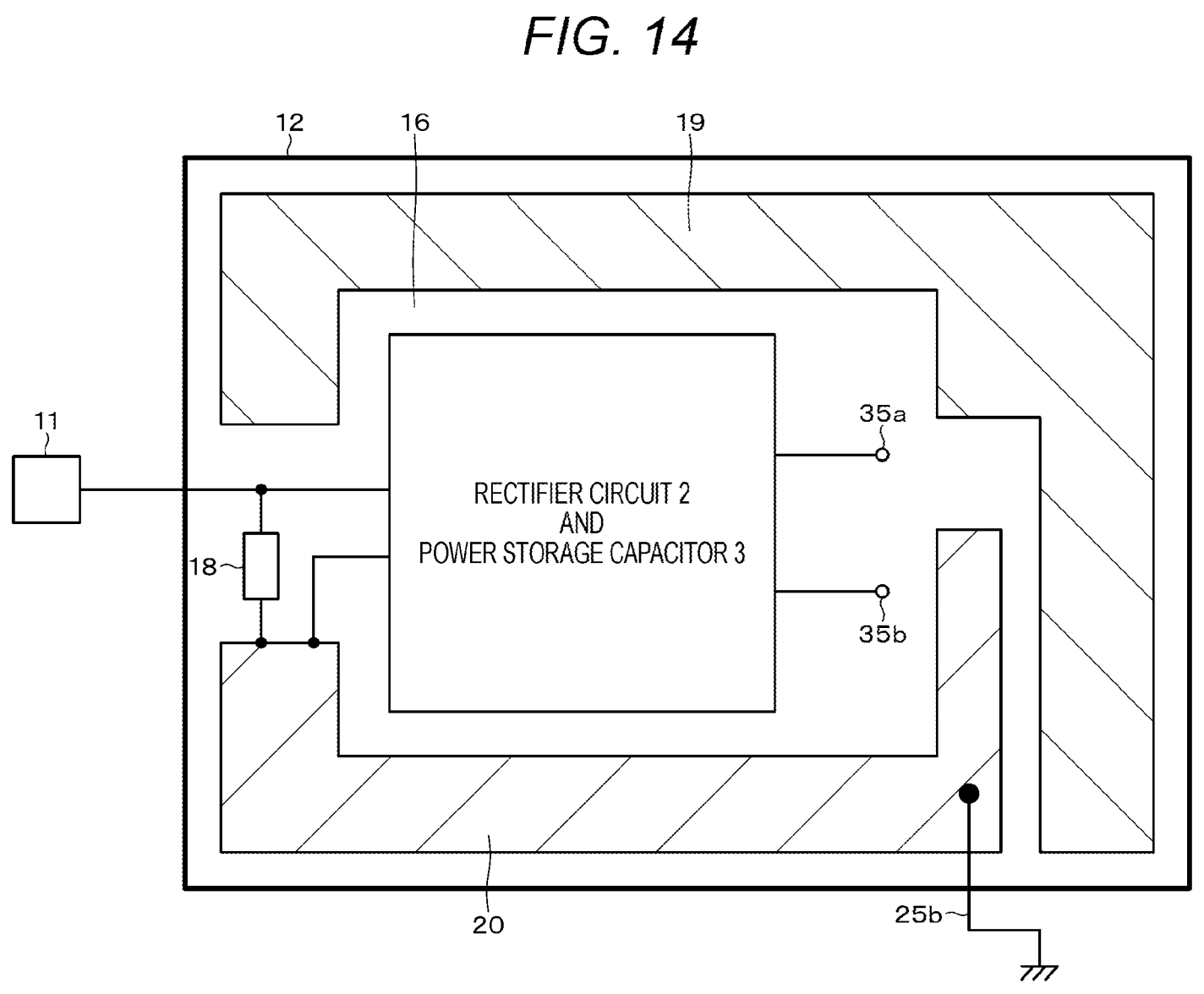

Moreover, as illustrated in FIG. 14, as an electrostatic countermeasure, an electrostatic protection component, for example, a varistor 18 may be inserted between the antenna element 11 in contact with the metal and the antenna element 20, and an insulating covered cable 25*b* may be connected to the antenna element 20 to be grounded to the earth ground. In this case, it is possible to extract much larger power than the electric field generated by the antenna element 20 with the ground of the earth by capacitive coupling. In a case where it is assumed that power is extracted from a metal product such as a microwave oven or a refrigerator in a room, it is required to drop the product to the ground as an electrostatic countermeasure. In a case where power is extracted from a metal portion of such a product, it is necessary to cope with the case by connecting the product with an insulating covered cable or the like as described above. Note that the varistor 18 may be connected between the output terminal 35*a* and the ground 19.

Figure 15:
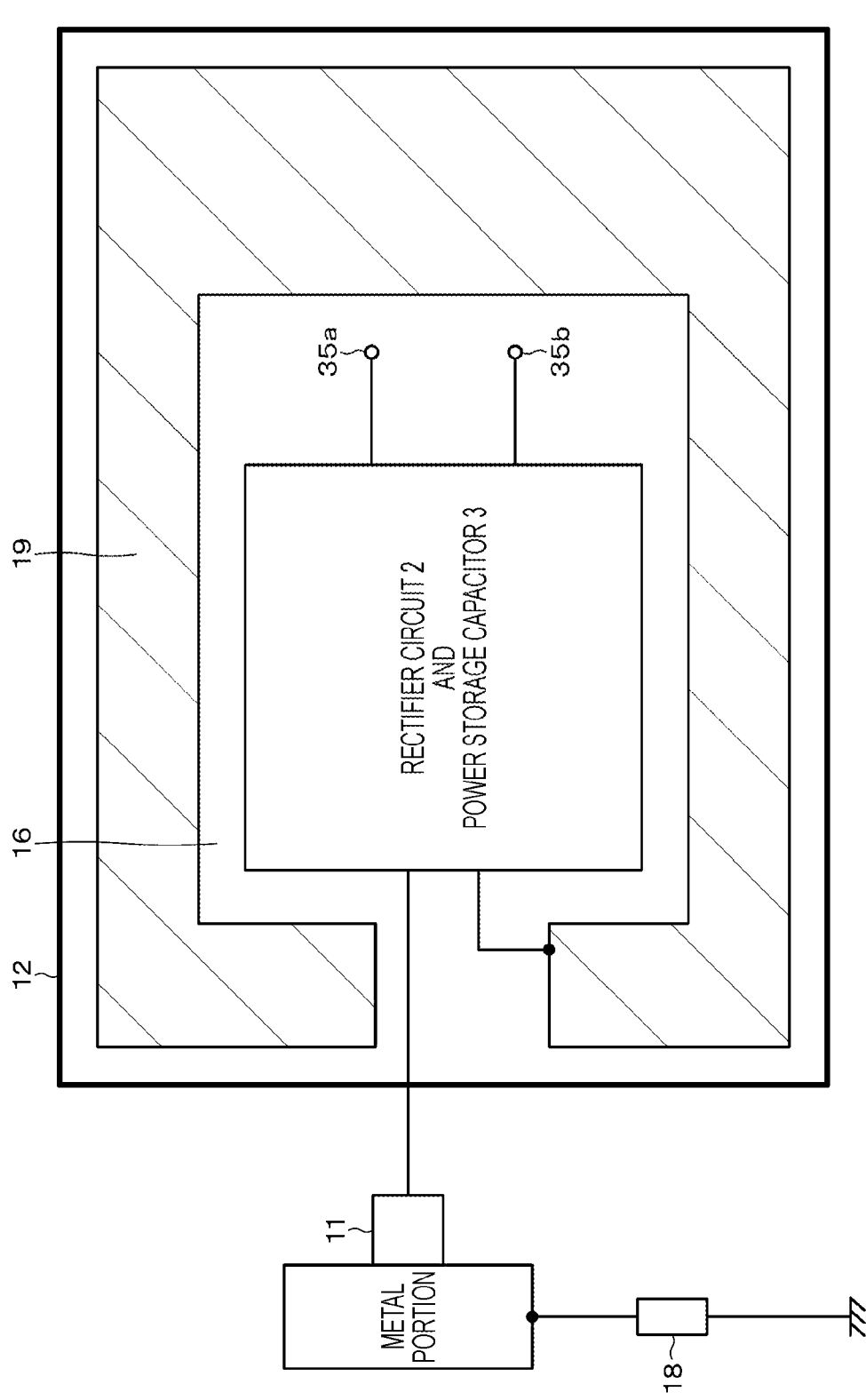
FIG. 15 is a connection diagram for explaining a modification of the energy collection device.
Figure 16:
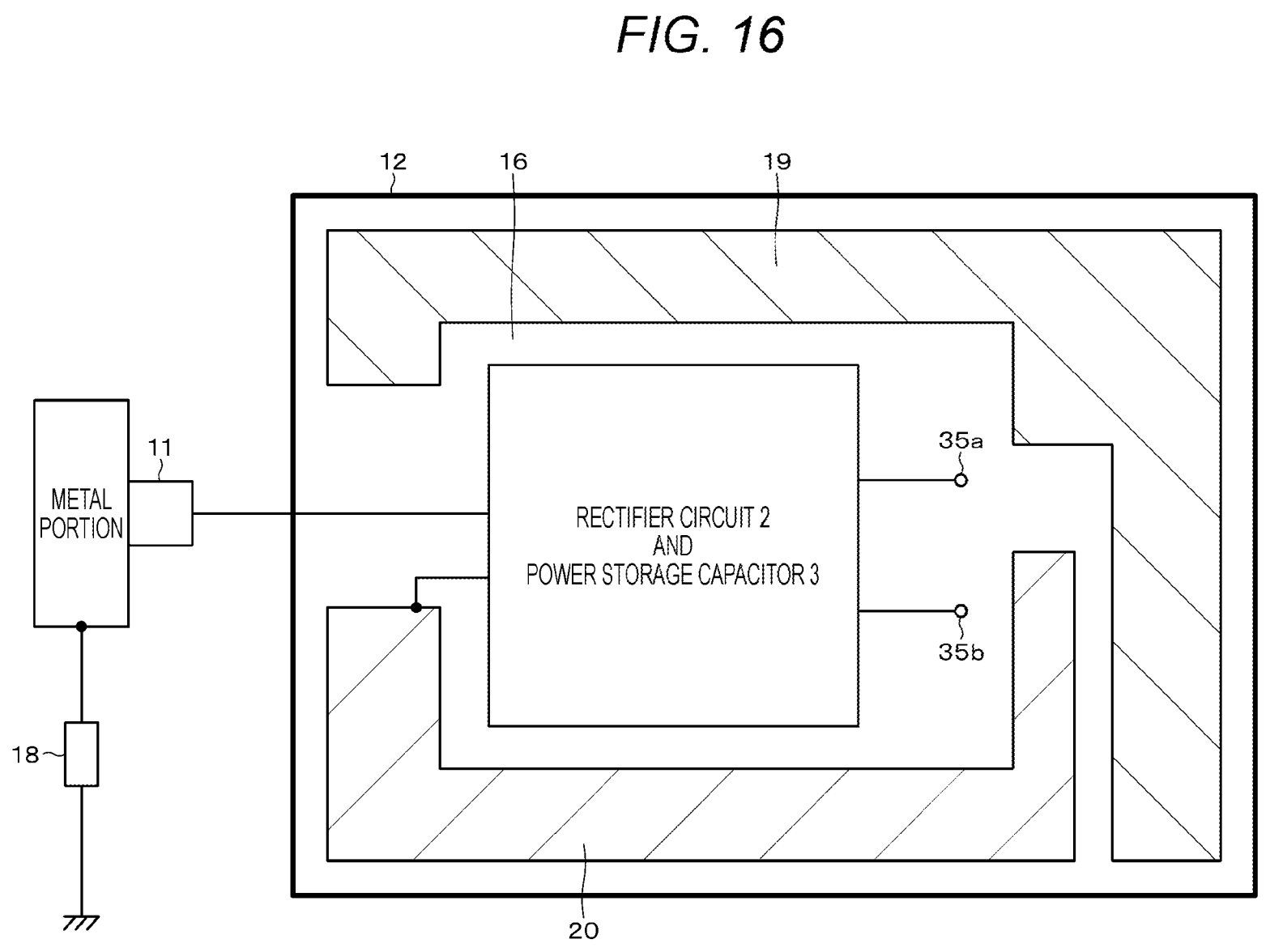

FIGS. 15 and 16 are diagrams illustrating modifications of FIGS. 10 and 12. That is, in a case where grounding is done by an insulating covered wire directly from the industrial product metal portion to the earth ground, it is grounded with an electrostatic protection component such as the varistor 18 or the like interposed in the middle of the insulating covered wire. In the case of an existing electrical appliance that requires a separate grounding connection, the above-described configuration is used. In this case, the electrostatic protection component is selected so as to be in a floating state in a frequency band in which the metal portion is harvested.

Figure 17A:
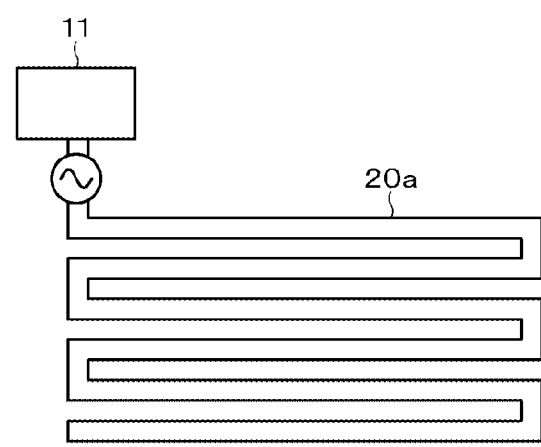
FIGS. 17A, 17B, and 17C are schematic diagrams illustrating specific examples of a second antenna element.
Figure 17B:
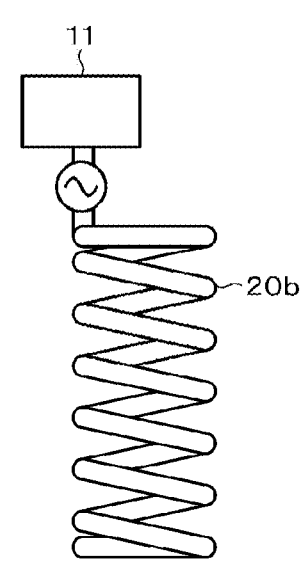
Figure 17C:
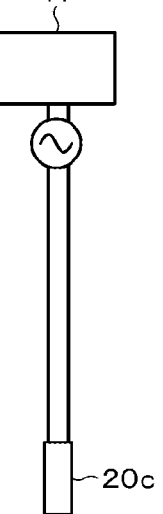

Another configuration of the second antenna element 20 is illustrated in FIG. 17. FIG. 17A illustrates a configuration of a meander line 20*a*, and FIG. 17B illustrates a configuration of a coil 20*b*. The coil 20*b* may be configured as a chip coil. FIG. 17C illustrates a configuration in which an inductor 20*c* is provided at the tip portion. These configurations can reduce the footprint and increase the antenna length, so that the induced voltage can be increased. In addition, the second antenna element 20 may be configured as a plate-shape antenna having broadband characteristics, and can be also used by a combination of the antennas illustrated in FIG. 17 or an appropriate combination with the above-described antenna.

Figure 18:
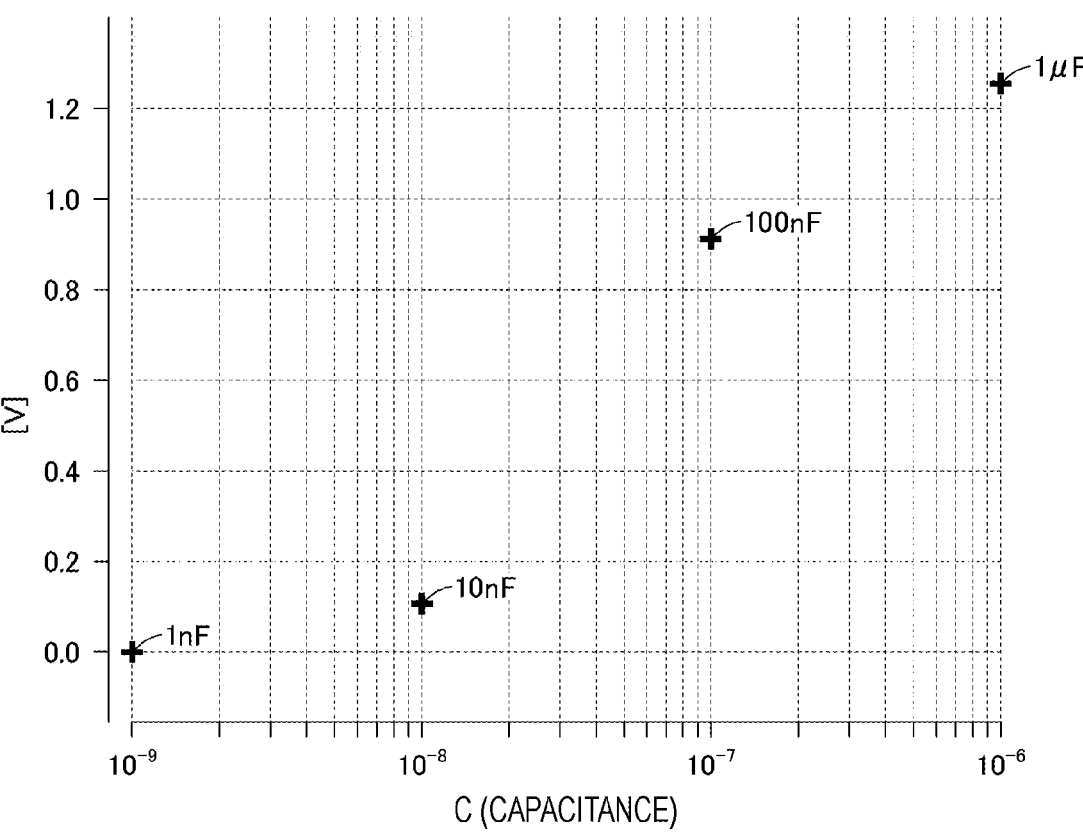
FIG. 18 is a graph showing a relationship between a capacitance of a power storage capacitor and an output voltage.
Figure 19:
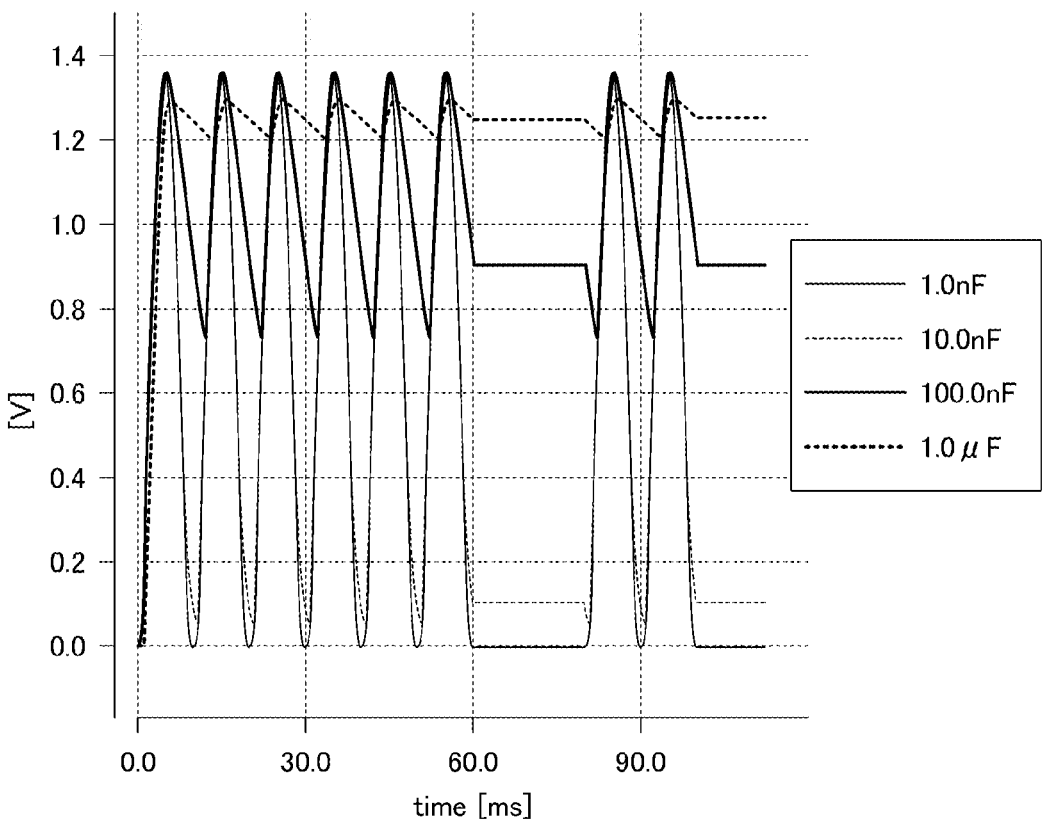
FIG. 19 is a graph showing a relationship between a capacitance of a power storage capacitor and an output waveform.

The results of simulation on the capacitance value of the power storage capacitor 3 and the frequency in the harvester 10 (the configuration illustrated in FIG. 5) according to the first embodiment of the present technology will be described. A load connected to the power storage capacitor 3 is set to 100 kΩ, and a signal of 1.5 V at 50 Hz similar to the output signal of the antenna unit 1 is differentially applied to the rectifier circuit 2 (the output resistance is set to 50Ω). FIGS. 18 and 19 show the results of checking on how the output voltage changes according to the change in the capacitance of the power storage capacitor 3.

In FIG. 18, the horizontal axis represents the value C of the power storage capacitor 3, and the vertical axis represents the output voltage Vo. FIG. 19 shows a waveform (temporal change) of the output voltage Vo corresponding to the value C of the power storage capacitor 3. FIG. 18 shows the output voltage Vo for each of C of 1 nF, 10 nF, 100 nF, and 1 μF. It can be seen from FIG. 18 that the maximum output voltage Vo can be generated at (C=1 μF). Furthermore, it can be seen from FIG. 19 that the ripple component (AC component) of the output voltage Vo is the smallest at (C=1 μF).

From the simulation results, it can be seen that when the capacitance of the power storage capacitor 3 is small, no charge is accumulated in the power storage capacitor 3 and passes through the power storage capacitor 3. That is, in a case where it is considered to harvest power at a low frequency of about 50 Hz, it can be seen that power cannot be stored without a certain capacitance or more although depending on the load resistance value. In the first embodiment of the present technology, the power storage capacitor 3 needs to be at least 1 μF or more, and is set to 10 μF or more in consideration of load resistance. According to the first embodiment, power harvested at a low frequency can be further increased. It is also possible to use a combination of the power storage capacitor 3 and a battery. That is, it is also possible to store charge in the power storage capacitor once, reduce the ripple, and charge the battery.

Figure 20:
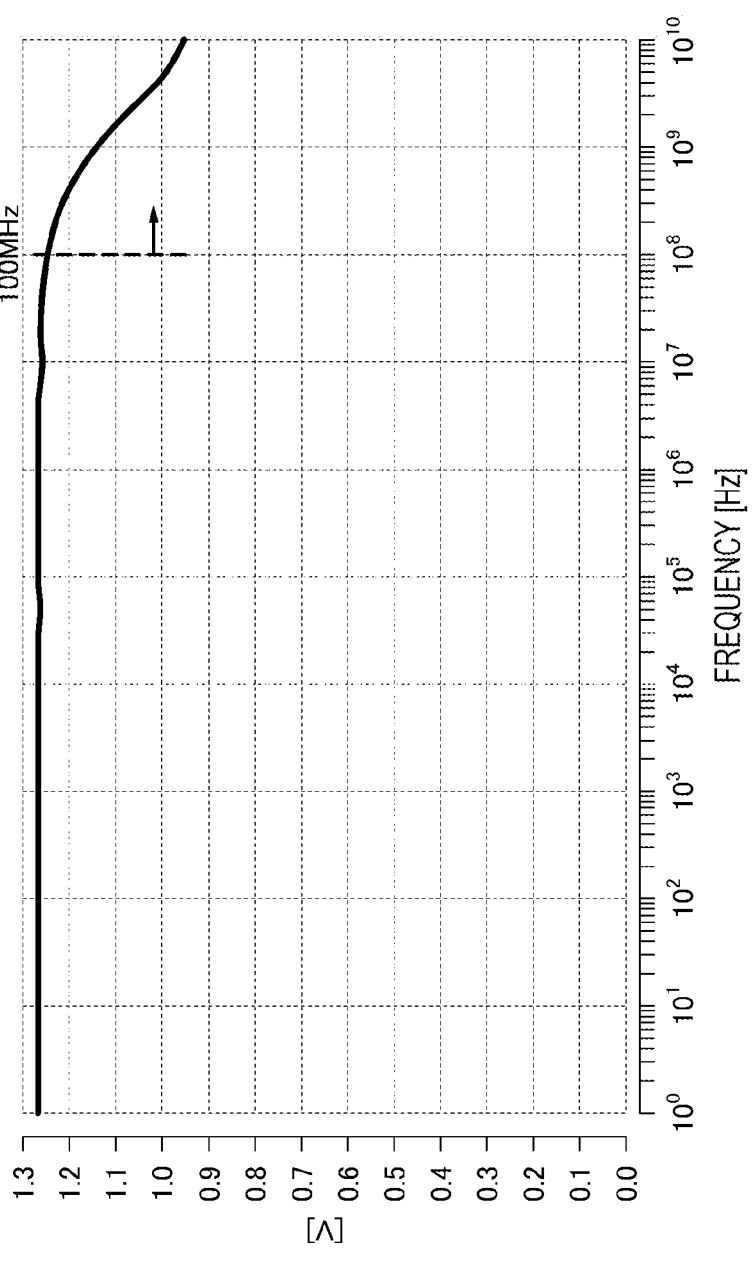
FIG. 20 is a graph illustrating a frequency characteristic of an output of the first embodiment.

Furthermore, simulation has been performed in a state where 100 μF is applied to the power storage capacitor and the output resistance of the antenna unit 1 is set to 50Ω in consideration of a low frequency such as 50 Hz, and as a result, as shown in FIG. 20, it has been found that the impedance decreases in a frequency band of 100 MHz or more due to the parasitic capacitance of the diode of the matching circuit 2. The input impedance of a normal diode is schematically formed by connecting a high resistance component and a parasitic capacitance in parallel. Therefore, in a frequency band of 100 MHz or less, the input impedance of the diode is high, and it is not necessary to consider the impedance of the antenna unit. However, when the frequency is 100 MHz or more, the impedance value decreases due to the influence of the parasitic capacitance of the diode. Therefore, in the case of using such a diode, it is difficult to harvest radio waves of a high frequency as energy.

Figure 21:
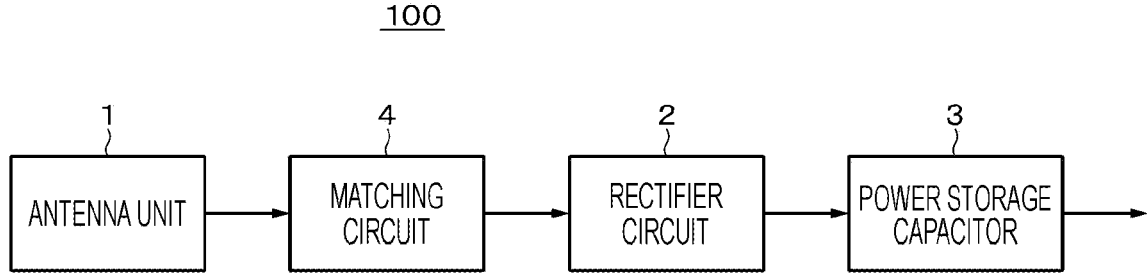
FIG. 21 is a block diagram of a second embodiment of the present technology.

A second embodiment improves such a point. FIG. 21 is a block diagram of a harvester 100 according to the second embodiment. Similarly to the harvester according to the first embodiment, the harvester 100 is a device that extracts electric field energy existing in space from a metal or a human body and outputs the energy as power.

Similarly to the first embodiment, the harvester 100 includes an antenna unit 1, a rectifier circuit 2, and a power storage capacitor 3, and a load is connected to the power storage capacitor 3. The antenna unit 1 functions as a reception antenna for receiving power via metal or a human body. For example, the antenna unit 1 receives electric field energy of a radio wave or a quasi-electrostatic field in space as power. Examples of the radio waves in space include various radio waves, and also include radio waves for power transmission such as WPT. Similarly to the first embodiment, also in the second embodiment, the power storage capacitor 3 is set to at least 1 μF or more, and is set to 10 μF or more in consideration of load resistance.

Figure 22:
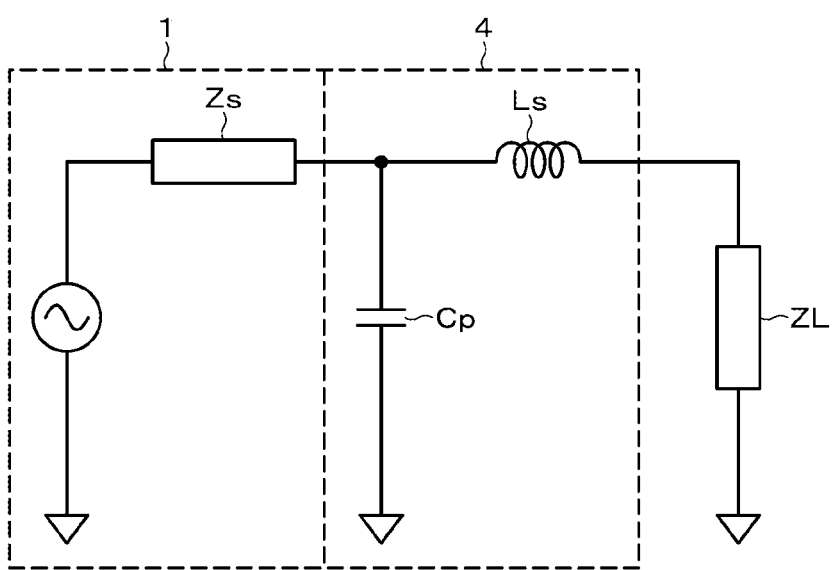
FIG. 22 is an equivalent circuit diagram for explaining a matching circuit.

In the second embodiment, a matching circuit 4 having a low-pass filter configuration is inserted between the antenna unit 1 and the rectifier circuit 2. FIG. 22 illustrates an equivalent circuit for explaining an example of the matching circuit 4. Zs represents an output resistance of the antenna unit 1, and ZL represents an input resistance of the rectifier circuit 2. The matching circuit 4 is a low-pass filter including a capacitor Cp inserted between the output of the antenna unit 1 and the reference potential and a coil Ls inserted between the output of the antenna unit 1 and the input of the rectifier circuit 2. As an example, (Cp=9.3 pF) (Ls=1.8 nH) is set. Note that the configuration of the matching circuit 4 is not limited to a parallel circuit of a coil and a capacitor, and may be a distributed constant circuit such as a pattern.

Figure 23:
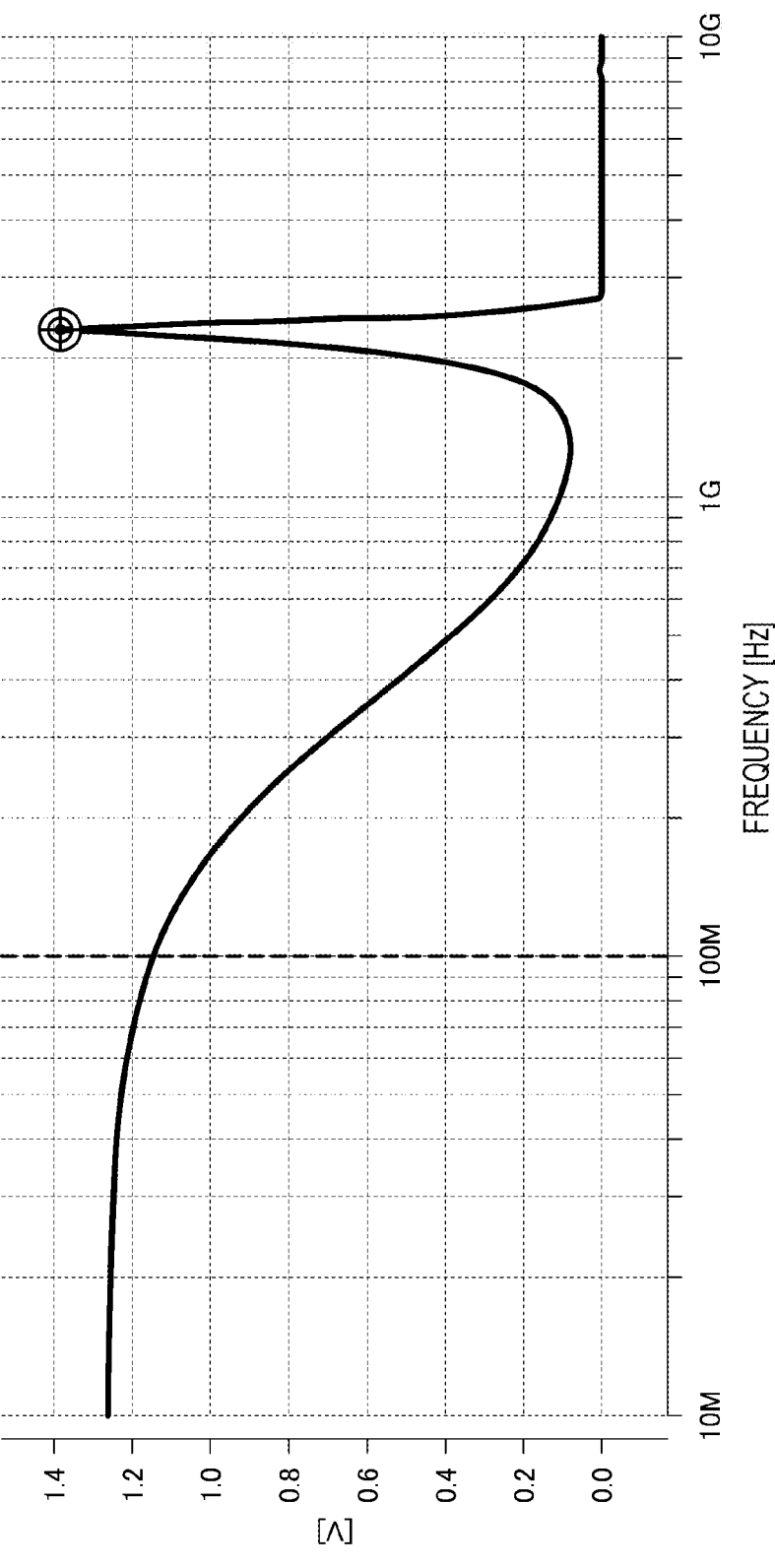
FIG. 23 is a graph illustrating a frequency characteristic of an output of the second embodiment.

FIG. 23 illustrates frequency characteristics (simulation results) of the second embodiment in which the matching circuit 4 is provided. In this example, power from a low frequency such as 10 MHz to a frequency around 100 MHz can be taken in, and power of a frequency around approximately 2.3 GHz can be taken in. Frequency values (100 MHz or more) that can be collected can be optionally set according to the values of the elements of the matching circuit 4. Therefore, in addition to a frequency of 100 MHz or less, an electric field energy of a certain specific frequency, for example, 900 MHz of a mobile phone, can also be taken in and can be rectified. According to the second embodiment, in addition to electric field energy from a low frequency emitted from a power supply such as 50 Hz to 100 MHz, a specific frequency at which matching has been made can also be received, and reception power can be greatly improved as compared with the related art. Separately, 10 MHz or less has been also checked, and power can be harvested without any problem.

Note that the specific frequency is not limited to 2.3 GHz, and may be any of a UHF band of a television signal, a 900 MHz band used in a mobile phone, a 2.4 GHz band used in a wireless LAN, and a 5 GHz band.

Figure 24:
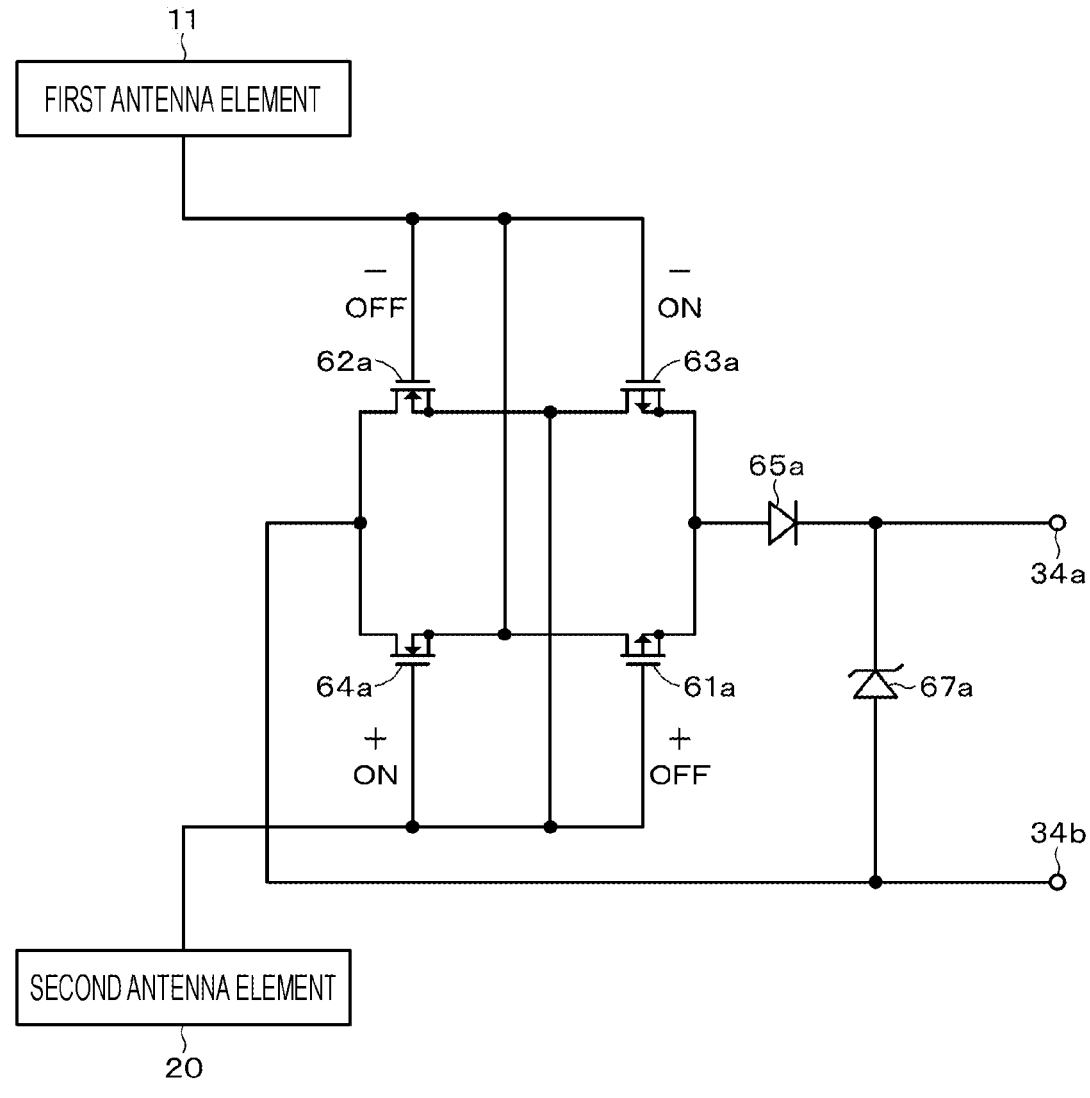
FIG. 24 is a connection diagram of another example of the rectifier circuit using a MOSFET instead of a diode.

As the rectifier circuit 2 connected to the antenna device 1, in addition to the configuration of the full-wave rectifier circuit using the diode illustrated in FIG. 5, as illustrated in FIG. 24, a rectifier circuit using a metal oxide semiconductor (MOS) field effect transistor (FET) instead of the diode as the switching element can be used. That is, the rectifier circuit is configured by four FETs 61a, 62a, 63a, and 64a, a backflow prevention diode 65a, and an FET protection Zener diode 67a.

The FETs 61a and 63a are P-channel depletion type MOSFETs, and when a – voltage is applied to the gate, a current flows from the drain to the source. The FETs 62a and 64a are N-channel depletion type MOSFETs, and when a + voltage is applied to the gate, a current flows from the drain to the source.

The drain of the FET 61a and the source of the FET 64a are connected to each other, and the source of the FET 62a and the drain of the FET 63a are connected to each other. The gates of the FETs 62a and 63a and a connection point of the drain of the FET 61a and the source of the FT 64a are connected to the antenna element 11. The gates of the FETs 61a and 64a and a connection point of the source of the FET 62a and the drain of the FET 63a are connected to the antenna element 20.

As illustrated in FIG. 24, in a phase in which the antenna element 11 side is – and the antenna element 20 side is +, the FET 62a is OFF, the FET 63a is ON, the FET 61a is OFF, and the FET 64a is ON.

A connection point of the source of the FET 61a and the source of the FET 63a is connected to one output terminal 34a via the backflow prevention diode 65a. A connection point of the drain of the FET 62a and the drain of the FET 64a is connected to the other output terminal 34b. The FET protection Zener diode 67a is connected between the output terminal 34a and the output terminal 34b. The four FETs 61a, 62a, 63a, and 64a may be configured as discrete or dedicated ICs.

In the rectifier circuit using the FET, a conduction form (N channel/P channel) of each FET may be exchanged. The rectifier circuit using the FET can be used instead of the rectifier circuit using the diode described above, and the same effects as those of the embodiment and the modifications thereof can be obtained. In particular, in a case where the frequency to be harvested is a low frequency such as 50 Hz, since the conversion efficiency of the element is better in the FET than in the diode, the FET may be used according to the frequency of the device to be harvested.

Figure 25:
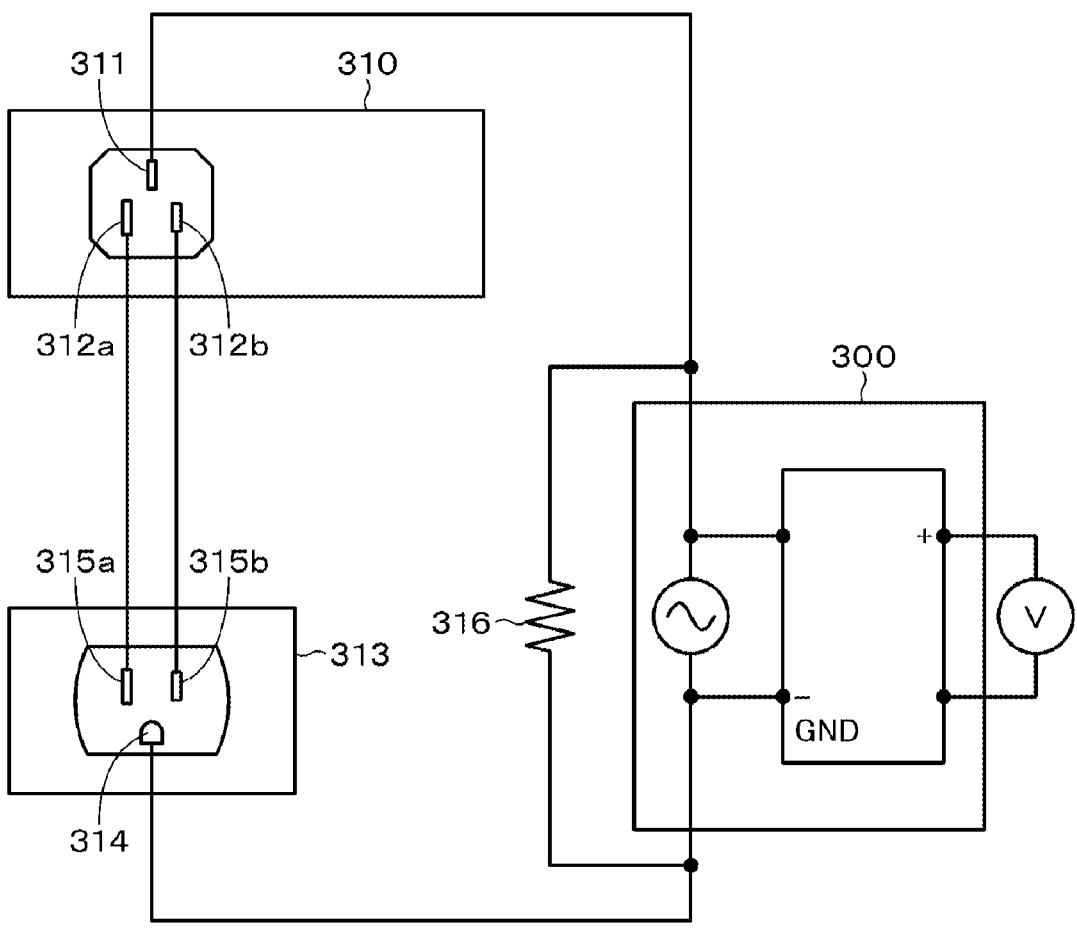
FIG. 25 is a schematic diagram illustrating a measurement device for measuring a relationship between the output of the energy collection device and a ground resistance.
Figure 26:
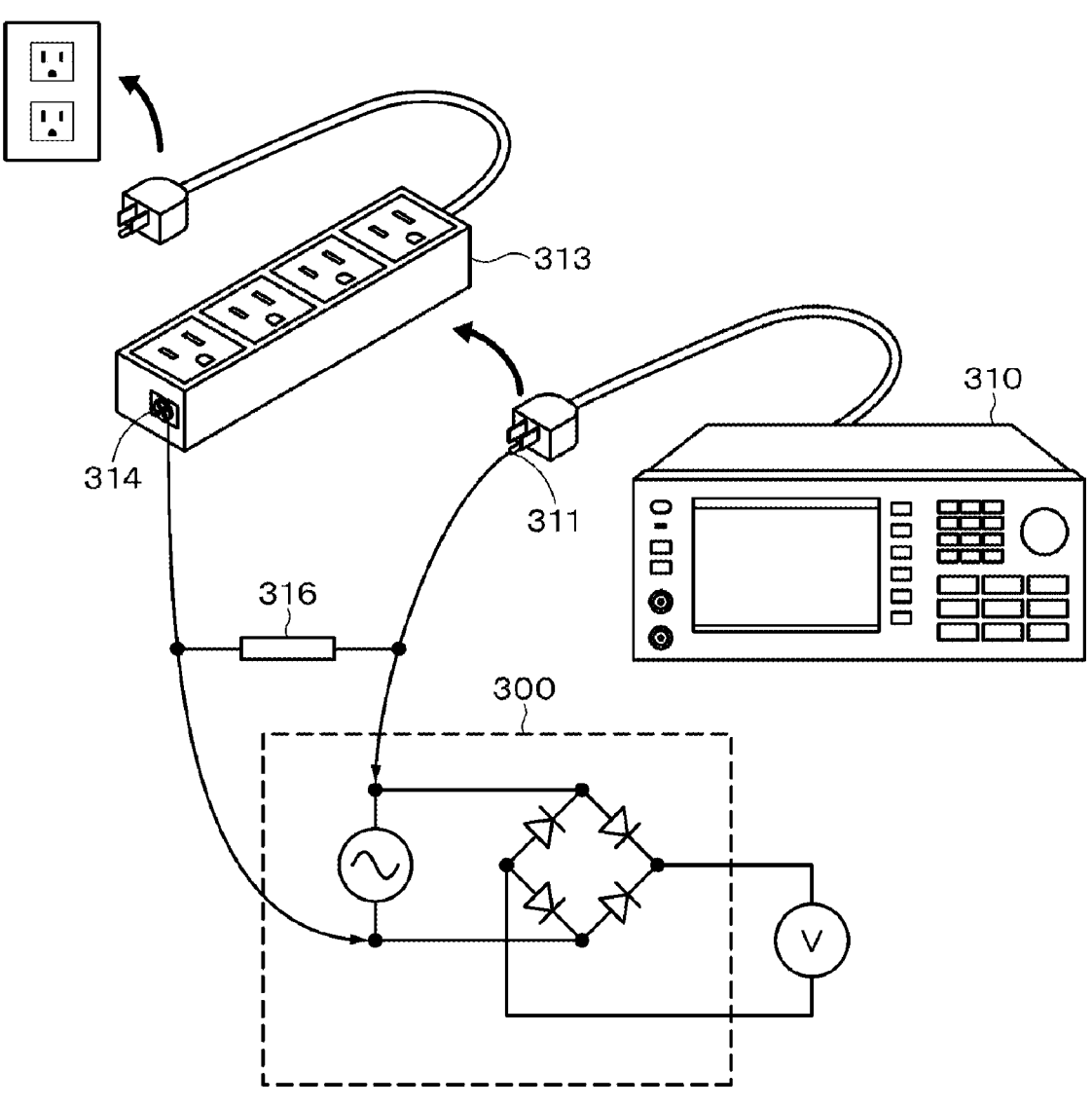
FIG. 26 is a schematic diagram illustrating the measurement device for measuring the relationship between the output of the energy collection device and the ground resistance.
Figure 27:
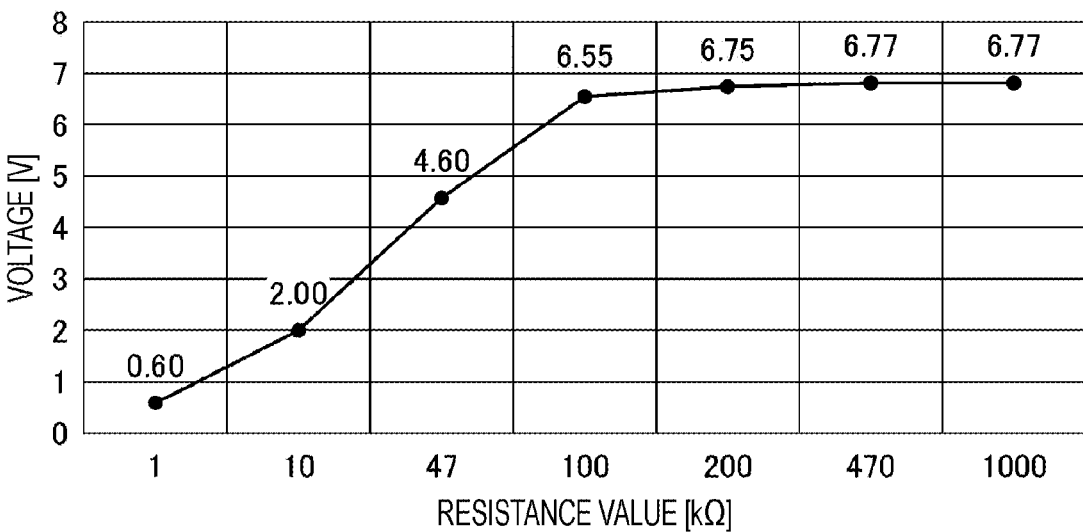
FIG. 27 is a graph illustrating the relationship between the output of the energy collection device and the ground resistance.

FIGS. 25 and 26 are schematic diagrams illustrating a measurement device for measuring the relationship between the output of a harvester 300 and the ground resistance. FIG. 27 is a graph showing the relationship between the output of the harvester 300 and the ground resistance. In the measurement device illustrated in FIGS. 25 and 26, a test harvester 300 (see FIG. 25) is connected between a ground terminal 311 of a device 310 (here, a measurement instrument driven at AC 100 V) and a GND (ground) 314 provided on a socket of a power tap 313. A resistance element 316 is connected between the input terminals of the harvester 300. The harvester 300 has the device 310 as one antenna element and the power tap 313 as the other antenna element.

In FIG. 25, one input terminal of the harvester 300 is connected to the ground terminal 311 of the device 310, and the other input terminal is connected to the GND 314. Note that the output terminals 315a and 315b of the power tap 313 are connected to the three power supply terminals 312a and 312b provided in the device 310, respectively, and AC 100 V is supplied thereto. The resistance element 316 is connected between the input terminals of the harvester 300. The resistance element 316 is an element such as a winding resistance in which a predetermined DC resistance value is set. The resistance element 316 functions as a ground resistance that connects the device 310 and the GND 314. For example, in a case where the resistance element 316 is sufficiently large, the device 310 is substantially in a floating state with respect to the GND 314.

In the measurement device illustrated in FIGS. 25 and 26, the output voltage (voltage between the output terminals) of the harvester 300 is measured by changing the DC resistance value of the resistance element 316. The graph shown in FIG. 27 shows the output voltage [V] detected by the harvester 300 in a case where the DC resistance value [Ω] of the resistance element 316 serving as the ground resistance is changed. For example, in a case where the DC resistance value is 1 kΩ, which is relatively low, the detection voltage is 0.60 V. Furthermore, in a case where the DC resistance value is 10 kΩ, a voltage of 2.00 V is detected, and in a case where the DC resistance value is 47 kΩ, 4.60 V is detected. As described above, the higher the DC resistance value, the closer the ground of the device 310 serving as one antenna element is to a floating state with respect to the GND 314, which is the ground of the ground, and the higher the detection voltage.

As the DC resistance value is further increased, for example, when the DC resistance value is 100 kΩ, the detection voltage is 6.55 V. This is substantially the same as the value (6.77 V) in a state where the resistance element 316 is removed and the ground of the device 310 is completely floating. That is, by inserting the resistance element 316 having a DC resistance of about 100 kΩ, one antenna element is substantially in a floating state with respect to the ground, and the harvester 300 induces a voltage. Note that, even when the DC resistance is in the range of 100 kΩ or less, for example, if the resistance value is 10 kΩ or more, it is possible to induce a voltage of 2.00 V or more, and the resistance value can be selected according to the intended use.

In FIGS. 25, 26, and 27, the DC resistance component of the ground resistance is described. On the other hand, the electric field energy taken in by the harvester 300 is mainly energy of an AC signal. Therefore, for example, when the resistance (impedance) to the AC signal of the target frequency is sufficiently large, it is possible to bring the ground of the device 310 close to a floating state at the frequency, and it is possible to induce a high voltage. Specifically, an inductance such as a coil can be used.

For example, in a case where an AC power supply of 50 Hz (or 60 Hz) is connected, an AC signal of 50 Hz (or 60 Hz) is considered to be a main source of electric field energy. Therefore, for example, in a case where the impedance at 50 Hz (or 60 Hz) is 10 kΩ or more, the ground of the device 310 is substantially in a floating state as described above, and energy can be efficiently taken in.

However, depending on the device 310 connected to the harvester 300, in order to prevent electric shock on a human body, grounding to the ground may be defined as a measure against electric leakage in some cases as safety standards. In this case, all the energy induced in the device 310 is released to the ground, and no voltage is induced.

Referring to the current safety standards in Japan, equipment to which the harvester 300 is applied includes equipment for which type D grounding work (hereinafter referred to as D grounding) is required. D grounding is grounding work performed on a low-voltage mechanical tool of 300 V or less, a metal outer box, and a metal pipe. For example, D grounding is performed on a device that needs to be grounded among devices used by being connected to a 100 V AC power supply. As an example, grounding of devices such as a microwave oven, a refrigerator, a washing machine, a dryer, an air conditioner, a dehumidifier, various measurement instruments, a factory robot, and a server device conforms to this standard. As described above, in a case where a general device is targeted, D grounding is the reference.

Hereinafter, it is assumed that D grounding is performed on a device to which the harvester 300 is applied. In D grounding, a ground resistance in which the DC resistance is 100Ω or less is required. Note that, in a case where a device that automatically cuts off the electric path within 0.5 seconds in a case where a ground fault (electric leak) occurs is provided in the low-voltage electric path, a ground resistance having a DC resistance of 500Ω or less may be used. For example, if there is a mechanism for cutting off power supplied to the device in a case where a dark current is detected, the ground resistance can be changed from 100Ω to 500Ω at D grounding.

In order to solve this problem and induce electric field energy in the harvester 300, it is desirable to provide a high impedance at the frequency of the AC signal induced in the device 310 and achieve a low resistance value that satisfies the safety standard in the DC. In the case of harvesting electric field energy of 100 MHz or more, which is a high frequency to some extent, it is possible to separate the DC and the frequency of the AC signal to be harvested from each other by the inductance of only the coil inserted between the ground wire and the harvester 300, and to configure a high impedance (100 kΩ or more) at the frequency of the AC signal to be harvested.

However, in a case where a low AC power supply of 50 Hz (or 60 Hz) is connected, it may be considered that an AC signal of 50 Hz (or 60 Hz) is a main source of electric field energy. In such a case, the inductance of only the coil has a very large value, and it is difficult to create a state of floating from the space only with the coil. That is, the inductance value is several 100 Henry, which is not realistic.

Figure 28:
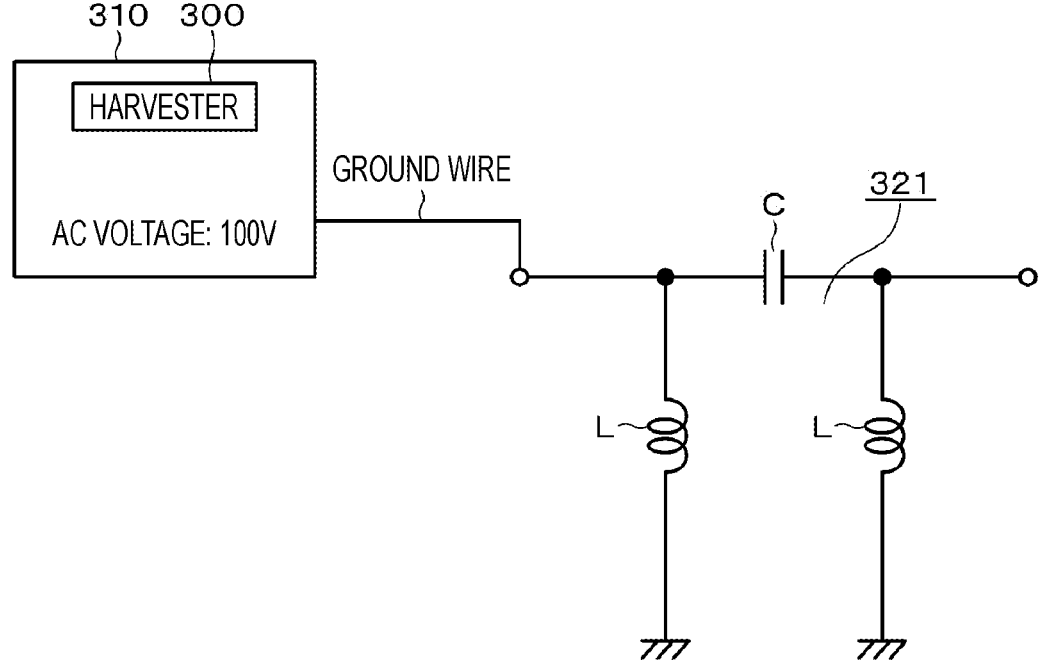
FIG. 28 is a connection diagram illustrating a circuit example of a high-pass filter structure.

In order to realize a state in which the device 310 is floating from such an AC signal of 50 Hz (or 60 Hz), a high-pass filter 321 (a Chebyshev high-pass filter) as illustrated in FIG. 28 is considered. The output terminal of the high-pass filter 321 is open. Since the coil is included in the front stage of the filter, a high impedance (100 kΩ or more) can be realized in an AC signal of 50 Hz (or 60 Hz) by setting the DC resistance value of the coil of this portion so as to satisfy the safety standard. As a result, the inductance of the coil can be reduced even at a low frequency, and miniaturization can be realized. For example, in the case of configuring this filter at 50 Hz, the DC resistance of the coil is 22Ω with the coil of 22 mH and the capacitor of 470 μF.01

Figure 29:
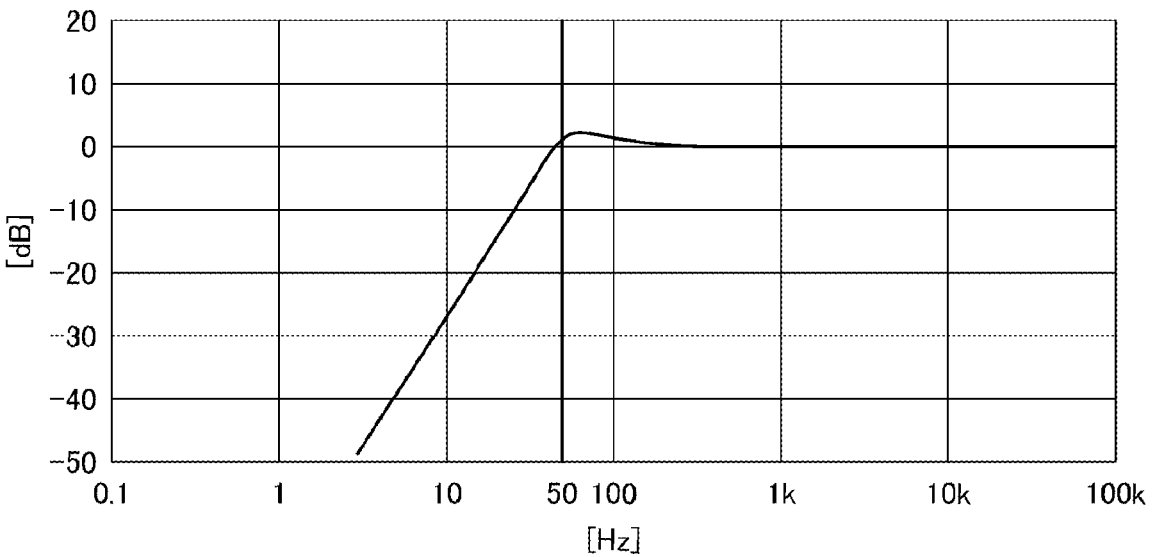
FIG. 29 is a graph illustrating an example of a frequency characteristic of the high-pass filter in FIG. 28.

The frequency characteristics of the high-pass filter 321 are as illustrated in FIG. 29. The capacitance of the capacitor has a frequency component and decreases at a frequency of 1 kHz or more while showing a high value at 50 Hz (or 60

Hz). Therefore, in a case where frequency components at more than that frequency are induced in the device 310 as electric field energy, when it is desired to harvest the energy, it cannot be handled only by the high-pass filter 321.

Figure 30:
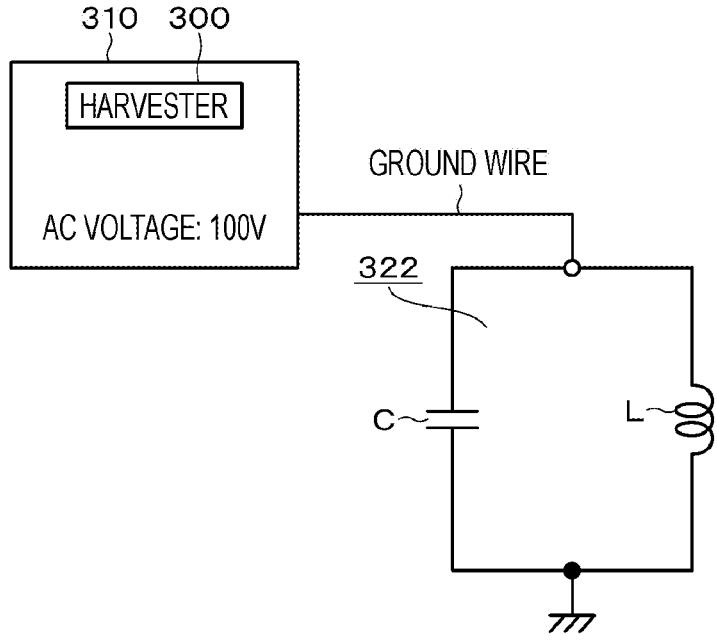
FIG. 30 is a connection diagram illustrating a circuit example for putting a device in a state of floating from the ground.

In order to solve such a problem, as illustrated in FIG. 30, a frequency component of the electric field energy induced in the device 310 is examined in advance, and a parallel resonance circuit 322 having a high impedance with the ground at the frequency can be configured between the ground wire and the ground.

Figure 31:
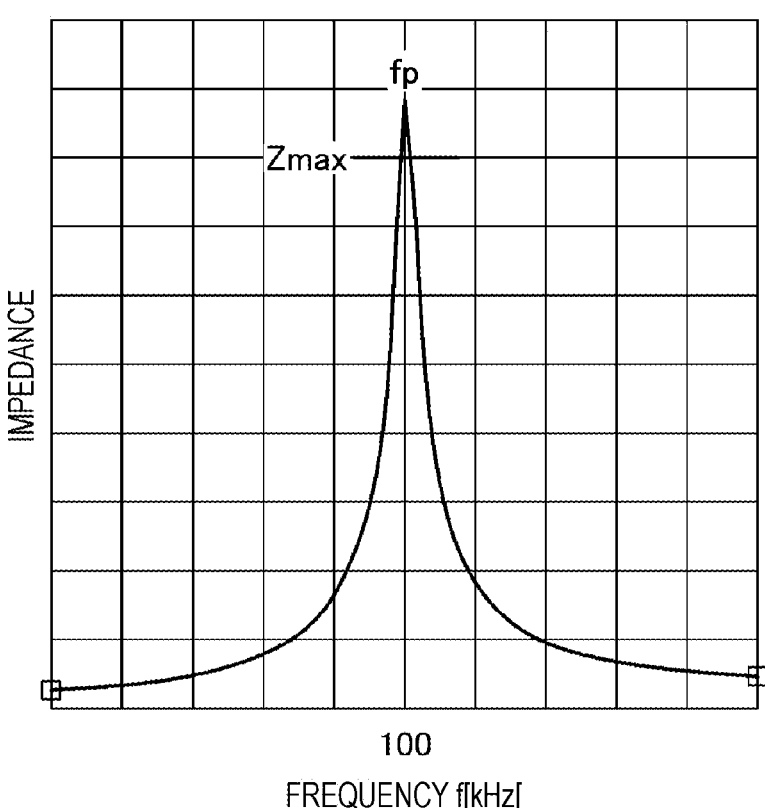
FIG. 31 is a graph illustrating an example of a frequency characteristic of a parallel resonance circuit in FIG. 30.

Since the parallel resonance circuit 322 has a configuration in which a coil and a capacitor are inserted in parallel, the parallel resonance circuit 322 has a high impedance at the frequency of the electric field energy induced in the device 310 and to be harvested. Since the DC is the DC resistance of the coil, the parallel resonance circuit 322 can be configured in a form satisfying the safety standard. For example, as illustrated in FIG. 31, in a case where the parallel resonance circuit 322 having a characteristic that the impedance is maximized at 100 kHz is configured, the DC resistance of the coil is 0.04Ω with the coil of 10 mH and the capacitor of 0.5 μF. The parallel resonance circuit 322 desirably includes an electrolytic capacitor because the frequency range in which the impedance is high becomes wider as the Q value is higher.

Figure 32:
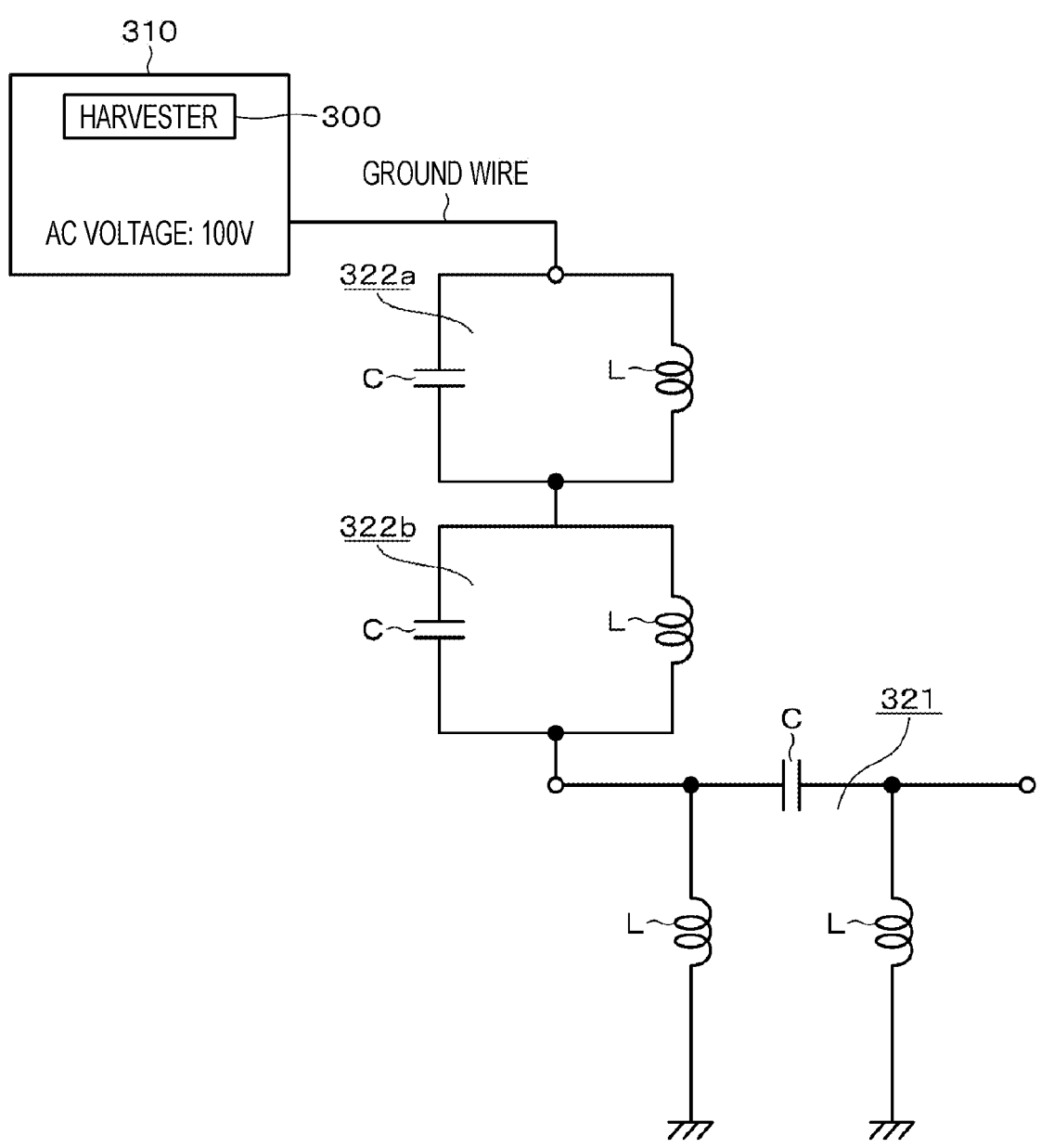
FIG. 32 is a connection diagram illustrating a circuit example for putting a device in a state of floating from the ground.

By combining the high-pass filter 321 and the parallel resonance circuit 322 (at least one or more), it is possible to take in electric field energy in accordance with various frequency components induced in the device 310 while satisfying the safety standard of performing D grounding of the device 310 with the ground wire. The high-pass filter 321 and the parallel resonance circuit 322 may be used alone in accordance with the frequency component of the electric field energy generated in the device 310, or may be used in combination as appropriate in accordance with the frequency to be harvested so as to satisfy the resistance value of the safety standard. FIG. 32 illustrates an example in which parallel resonance circuits 322a and 322b and the high-pass filter 321 are combined.

Although the filter that causes the device 310 to be a floating state in accordance with the frequency to be harvested has been described so far, the first antenna element of the harvester 300 may be connected to the output terminal (open) of the high-pass filter of the filter in the middle of the ground, and the second antenna element may be configured by grounding (see FIG. 33A) or an antenna such as a meander line of copper foil on the board. For example, in the case of a three-terminal outlet described in FIG. 26, which has a GND line and is present in a factory, the harvester 300 can be configured in a plug portion of the device 310, so that it is possible to harvest energy from the entire device 310 by using the GND of the device 310 as an antenna element.

Figure 33A:
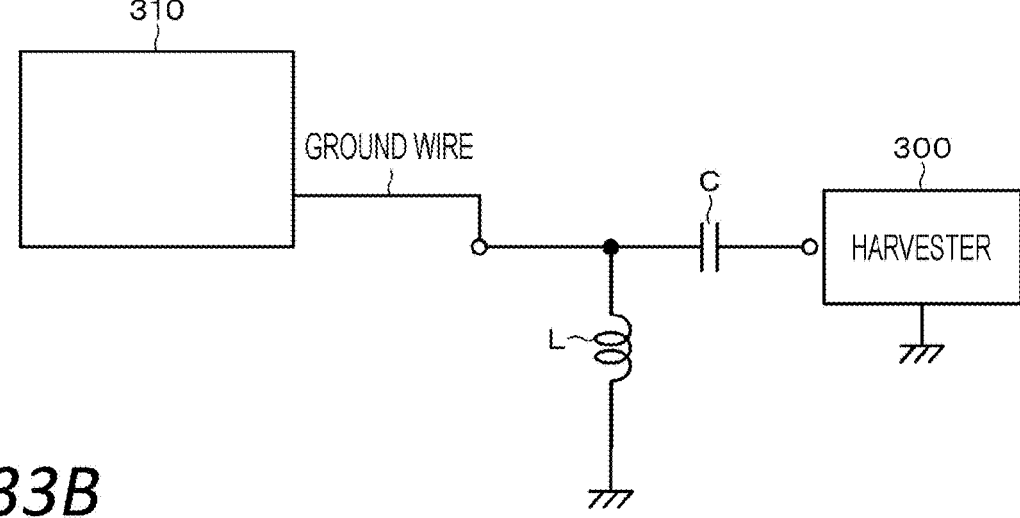
FIGS. 33A, 33B, and 33C are block diagrams illustrating a plurality of circuit examples.
Figure 33B:
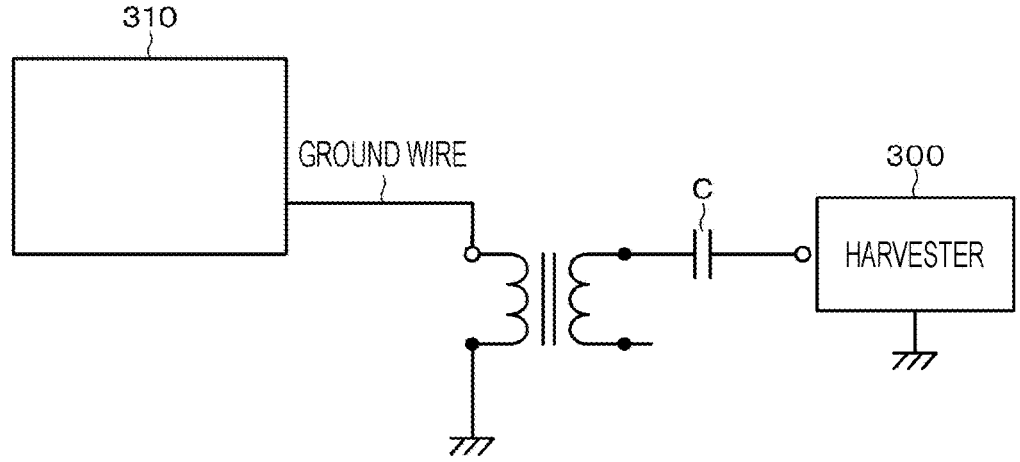
Figure 33C:
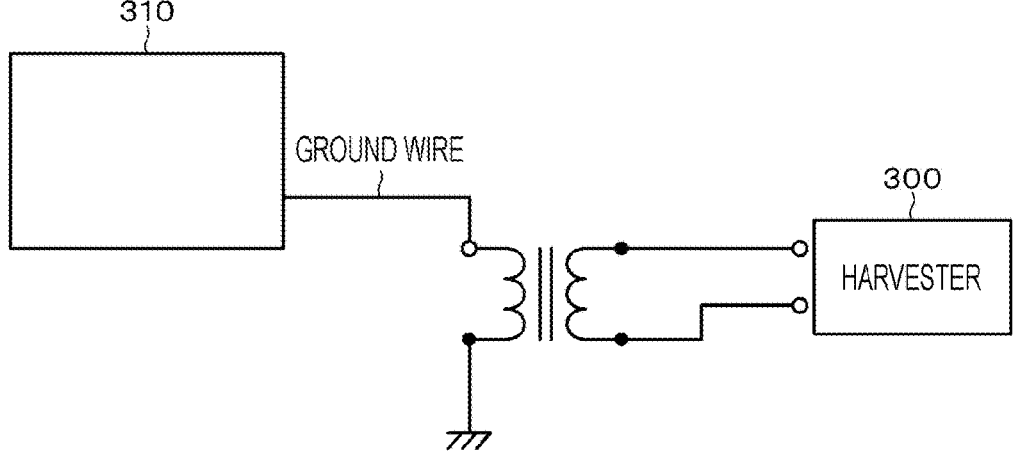

In the configuration of FIG. 33A, the high-pass filter is connected, but a transformer may be connected as illustrated in FIG. 33B or 33C. Since the harvester 300 and the device 310 are completely separated from each other by the transformer, it is possible to prevent a large current from flowing through the harvester 300 at the time of electric leak, and it is possible to enhance the safety. In this example, the configuration using the high-pass filter and the transformer has been described, but the configuration can be replaced with the parallel resonance circuit and a leakage filter such as an inductor described above.

A device that is connected to a commercial AC power supply and does not need to be grounded, for example, a product such as a television, a hard disk recorder, a game, or an audio device, is a device floating from the ground.

Furthermore, drones and vehicles are used with a certain resistance with the earth of the ground. In order to efficiently harvest power using these devices, for example, it is necessary to separate GND of a power supply board using an inverter circuit that generates large power and other metal portions of the devices. From the above-described experimental results, it can be seen that if the resistance for separation has a resistance value of 10 kΩ or more, the antenna element 1 and the antenna element 2 can be separated to harvest power.

Figure 34:
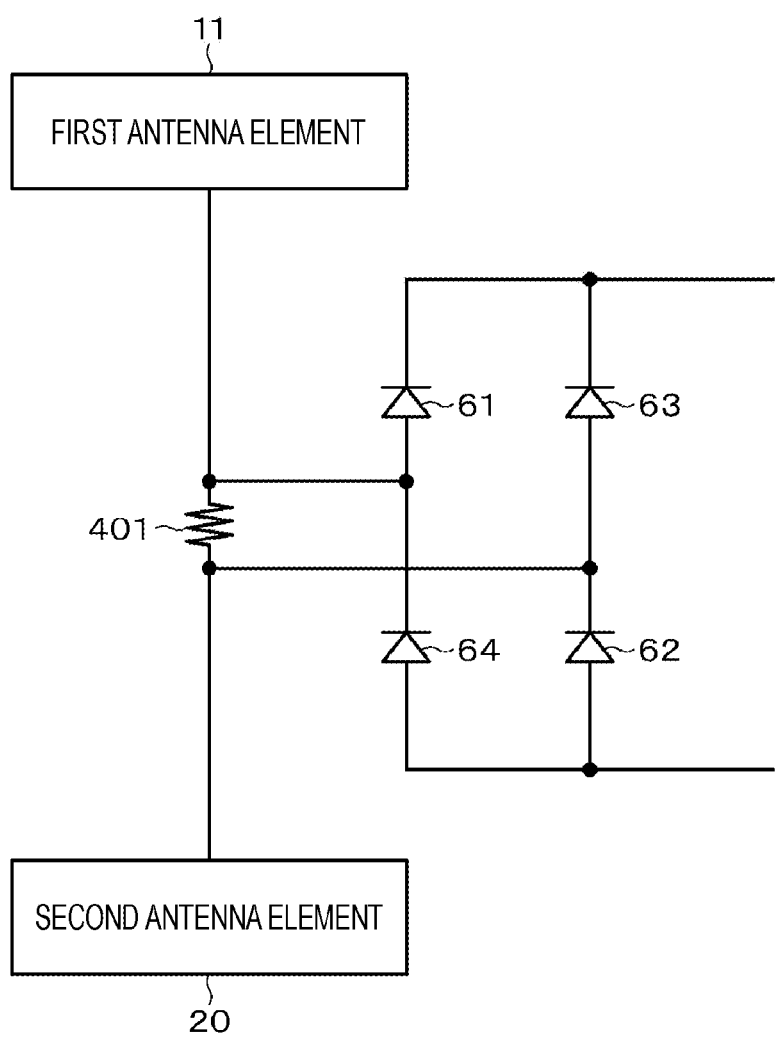
FIG. 34 is a connection diagram illustrating an example in which two antenna elements are configured by being separated with a resistor.

That is, as illustrated in FIG. 34, when GND of the power supply board using an inverter circuit that generates large power is set as the first antenna element 11 and the other metal portion of the device is set as the second antenna element 20, power can be harvested from the harvester by inserting the resistor 401 of 10 kΩ or more between the antenna elements and separating the antenna elements. By separating the antenna elements in advance inside the device in this manner, it is possible to harvest a large amount of power as compared with an arrangement in which a harvester is placed outside and the harvester and the device are connected and used.

Figure 35:
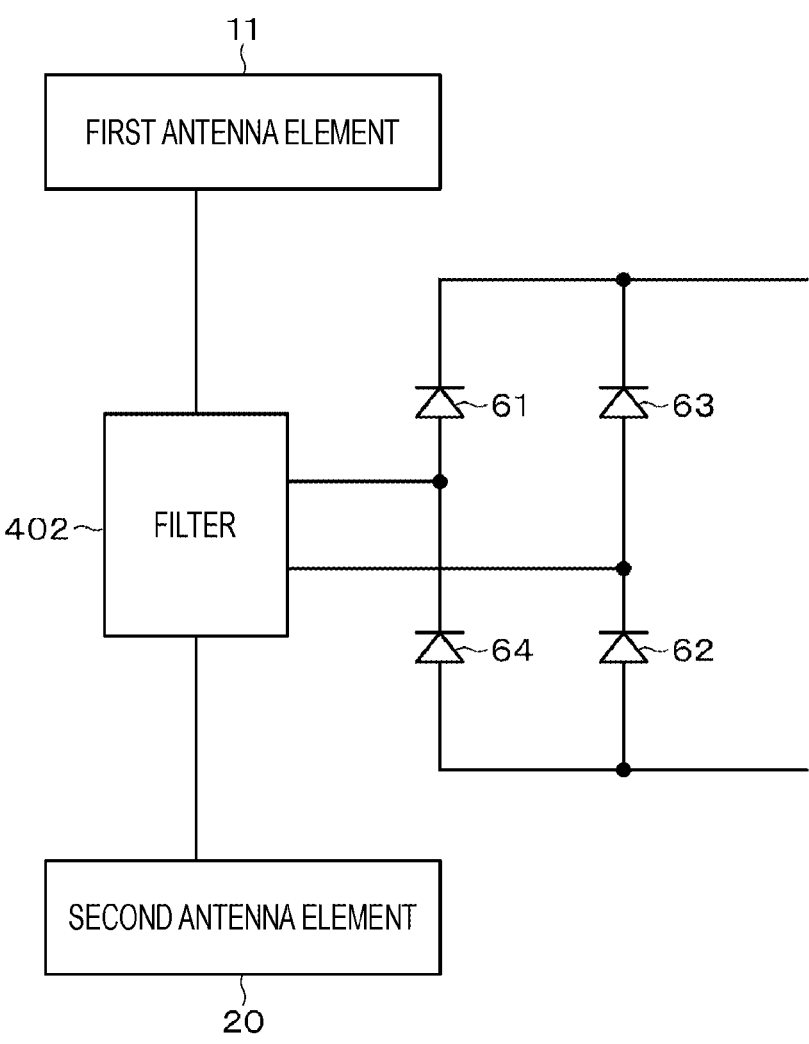
FIG. 35 is a connection diagram 35 illustrating an example in which two antenna elements are configured by being separated with a filter.
Figure 36A:
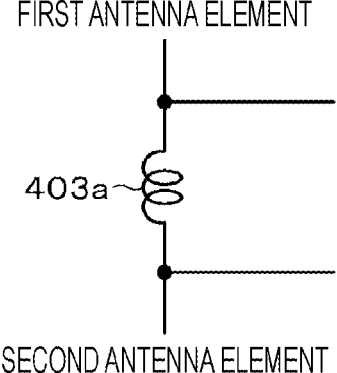
FIGS. 36A, 36B, 36C, and 36D are connection diagrams illustrating a plurality of examples of a filter.
Figure 36B:
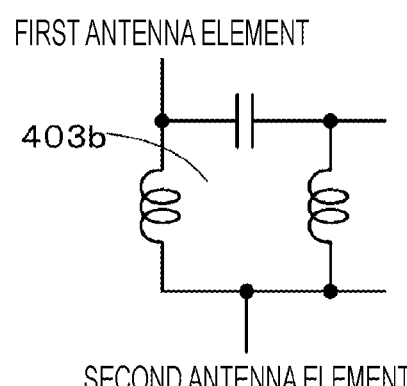
Figure 36C:
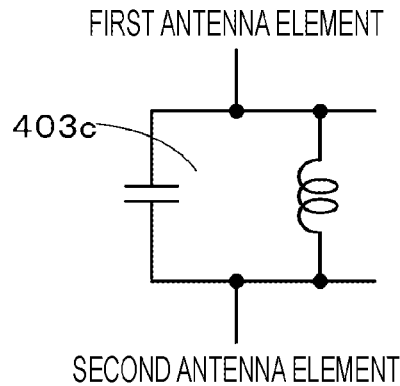
Figure 36D:
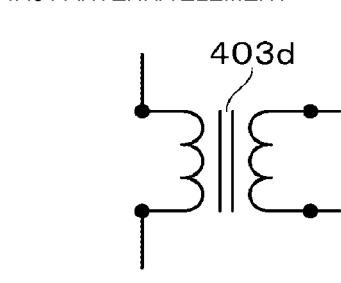

Moreover, as illustrated in FIG. 35, by connecting a filter 402 instead of the separation resistance, a very low resistance can be achieved in the DC, and the resistance value can be increased according to the frequency of the power to be harvested. Specific examples of the filter 402 include an inductor 403a (FIG. 36A), a high-pass filter 403b (FIG. 36B), a parallel resonance circuit 403c (FIG. 36C), and a transformer 403d (FIG. 36D), or the like according to the frequency of the power to be harvested. By connecting the filter 402 instead of the separation resistance, a very low resistance can be achieved in the DC, and the resistance value can be increased according to the frequency of the power to be harvested. In particular, in a case where the transformer 403d is used, the antenna elements are completely separated from the device in terms of DC, and thus it is safe to use the harvester.

Figure 37:
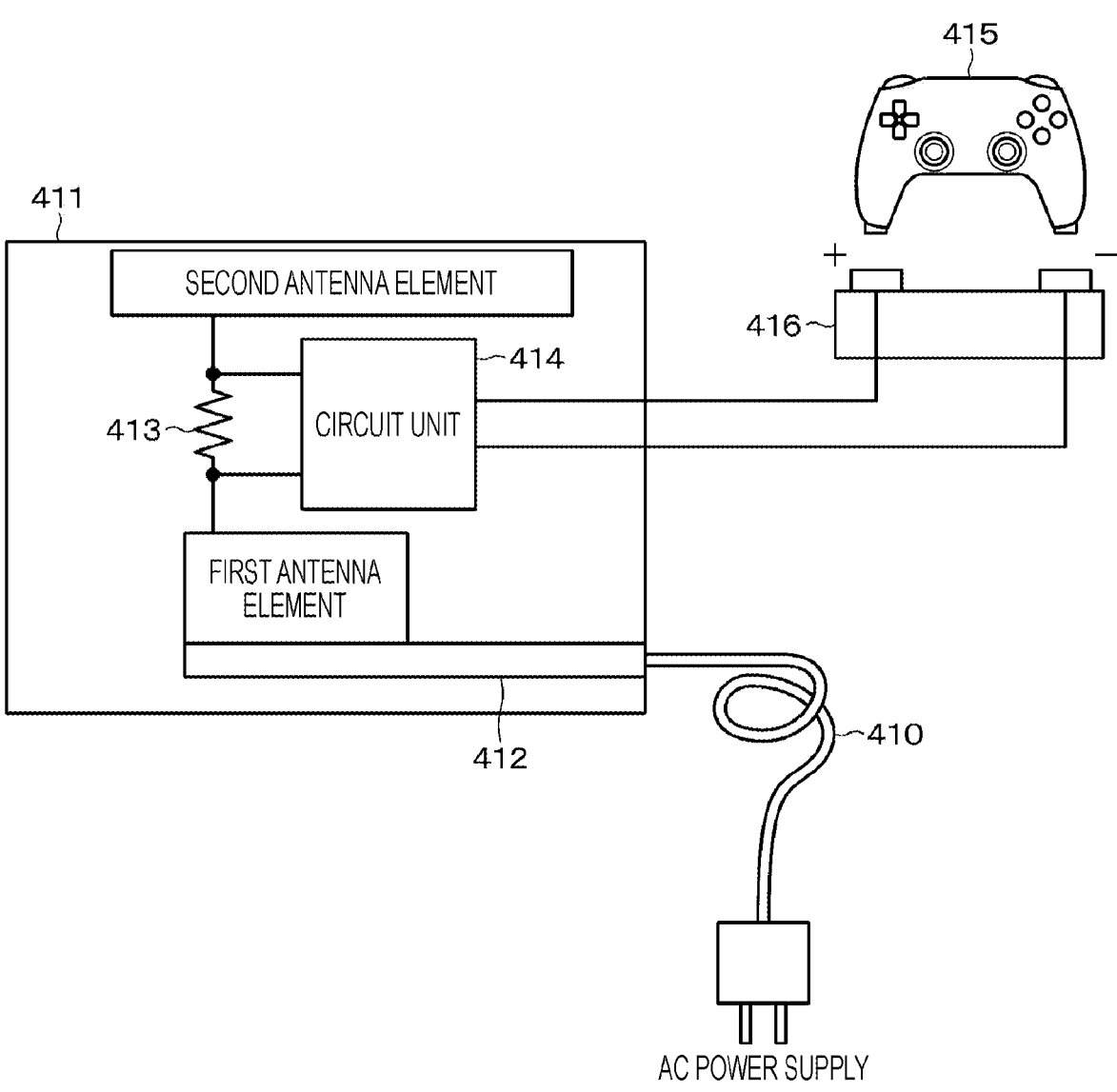
FIG. 37 is a schematic diagram illustrating an example in which the present technology is applied to charging of a game controller of a game machine.

FIG. 37 illustrates an example in which the present technology is applied to a game machine connected to an AC power supply by a cable 410 and in a state of floating from GND. GND of a power supply board 412 of a game machine 411 is used as the first antenna element, and a metal case portion, a heat sink, or the like of the game machine 411 is used as the second antenna element. These antenna elements are connected by a separation resistor 413 (10 kΩ or more). Outputs from both ends of the separation resistor 413 are input to a circuit unit 414. The circuit unit 414 is provided with the rectifier circuit 2 and the power storage device 3 illustrated in FIG. 1, and the stored power is supplied from the rectifier circuit 2 and the power storage device 3 to a charging stand 416 of a game controller 415 via a cable. Furthermore, the power storage device 3 may be omitted depending on the application. In the above-described example, the cable is pulled out from the circuit unit 414 to the charging stand 416, but the power may be supplied to the connector on the side surface of the game machine body for charging.

The harvested power is supplied to the charging stand 416 of the game controller 415. When the game controller 415 is placed on the charging stand 416, the game controller 415 is charged with a mechanical contact, a non-contact, or the like. Note that the filter 402 may be used instead of the separation resistor 413. Furthermore, it is also possible to integrally form the charging stand 416 on the main body of the game machine 411. Moreover, in a case where a shield portion of a connector is connected to GND, performance of a local area network (LAN) cable or a high-definition multimedia interface (HDMI, registered trademark) cable is deteriorated. Therefore, it is necessary to prevent the shield portion of the connector from being connected to GND such as a power supply board.

Figure 38:
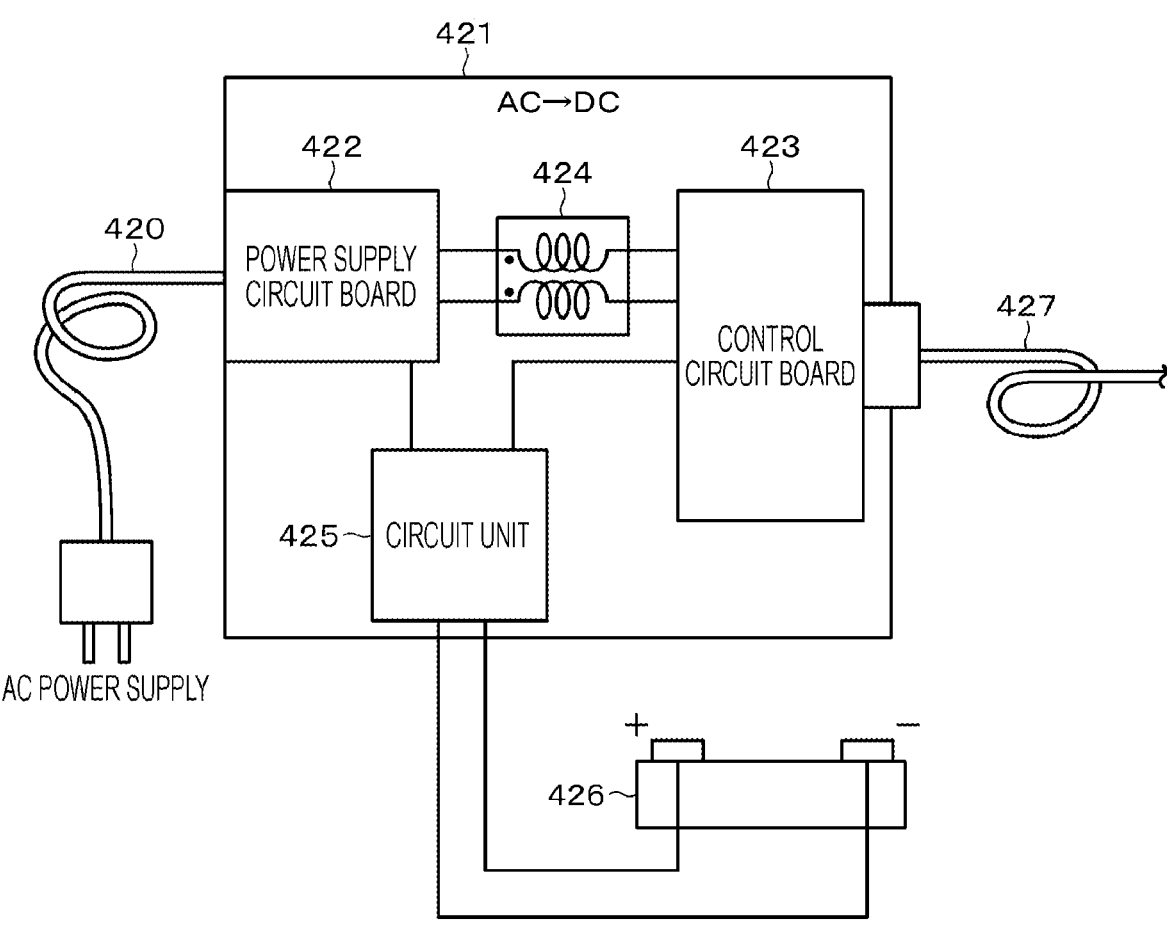
FIG. 38 is a schematic diagram illustrating another example in which the present technology is applied to charging of a game controller of a game machine.

FIG. 38 illustrates another example in which the present technology is applied to a game machine. A game machine 421 is connected to an AC power supply by a cable 420. A power supply circuit board 422 on which a converter or the like for generating a DC power supply from an AC power supply is mounted and a control circuit board 423 on which a control unit is mounted are provided inside the game machine 421. The GND of the power supply circuit board 422 is used as the first antenna element, and the GND of the control circuit board 423 is used as the second antenna element.

A common mode choke filter 424 is inserted between the GNDs of the power supply circuit board 422 and the control circuit board 423. The GND of each board and a circuit unit 425 are connected. The circuit unit 425 is provided with the rectifier circuit 2 and the power storage device 3 illustrated in FIG. 1, and the stored power is supplied from the rectifier circuit 2 and the power storage device 3 to a charging stand 426 of the game controller. Furthermore, the power storage device 3 may be omitted depending on the application. In the above-described example, the cable is pulled out from the circuit unit 425 to the charging stand 426, but the power may be supplied to the connector on the side surface of the game machine body for charging.

Since the power supply circuit board 422, which generate noise, and the control circuit board 423 are separated from each other, the antenna length appears long in a case where a cable 427 having GND (cable such as a LAN cable or an HDMI (registered trademark) cable) is connected to the control circuit board 423, so that it is possible to obtain large power. Since DC is output from the power supply circuit board 422 to the control circuit board 423, the DC is separated by a filter, for example, the common mode choke filter 424. Furthermore, in a case where it is difficult to add a separation resistance or a filter, it is possible to cope with the case by providing a metal portion on the back surface of the power supply circuit board 422 to be the first antenna element so as to be capacitively coupled to the noise generation source. Furthermore, a heat sink (insulated from the power supply circuit board 422) for heat dissipation provided on the power supply circuit board 422 can also be used as the first antenna element.

The present technology is applicable not only to a game machine but also to a television receiver, a hard disk recorder, and an audio device. Furthermore, the present invention can be applied not only to the charging power supply of the game controller but also to the charging power supply of the internal battery of the device and the power supply such as for measuring the temperature inside the device (for example, a device used in a smart factory or a smart city).

Figure 39:
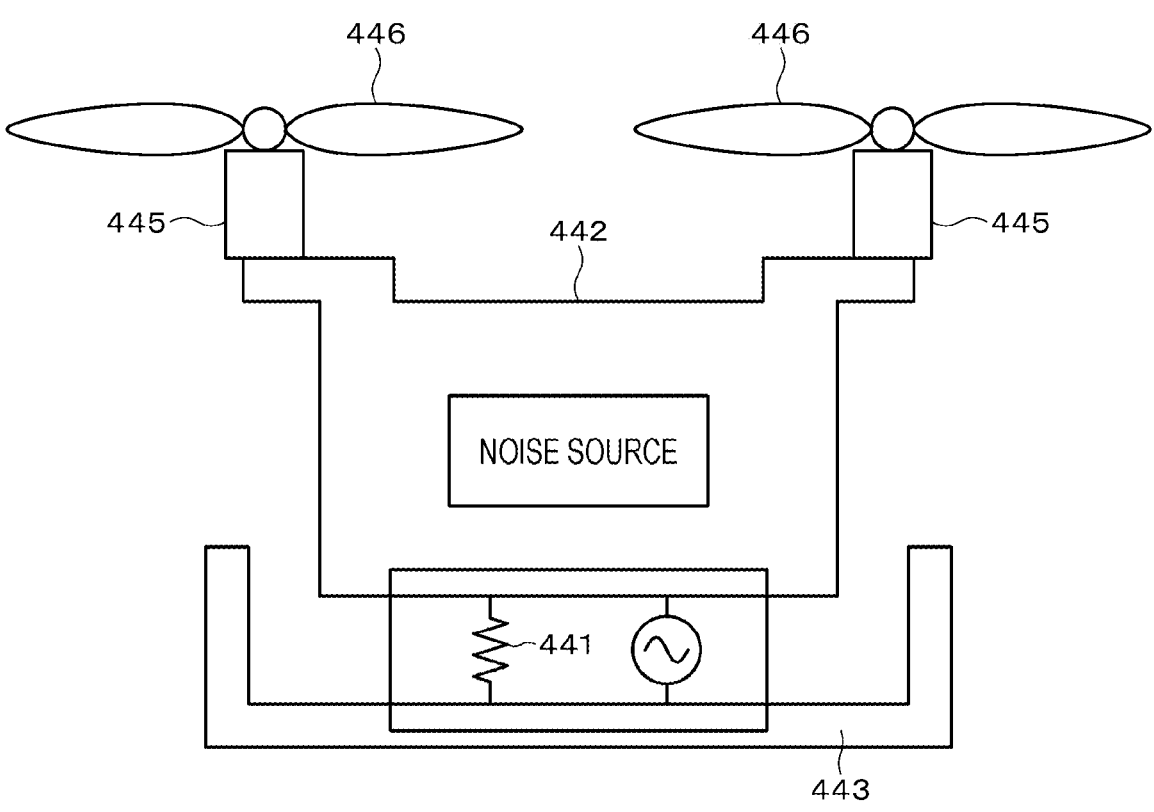
FIG. 39 is a schematic diagram illustrating another example in which the present technology is applied to a power supply of an unmanned aerial vehicle (hereinafter, appropriately referred to as a drone).

FIG. 39 illustrates an example in which the present technology is applied to a drone. The drone flies by rotating the propeller by the motor. In the power supply circuit of the drone, an inverter circuit is mounted for motor control, and noise of various frequencies is generated. By separating the drone upper mechanism including the noise source and the power supply circuit and the lower mechanism by a separation resistance and connecting a circuit unit, it is possible to extract large power as in the case of the game machine described above. Moreover, the power can be used as a power supply for driving a sensor such as a temperature or a humidity sensor.

In an example of the drone, the drone includes a metal main body 442 and a lower metal frame 443.

The main body 442 houses a control unit, a battery unit as a power source, and the like in a metal case. The power generation device in FIG. 1 is provided in the main body 442. A plurality of support shafts extending substantially horizontally from the main body 442 are provided, and a motor 445 as a drive source of a rotor blade 446 is attached to a distal end surface of each support shaft. The rotor blade 446 is attached to a rotation shaft of the motor 445. A motor control circuit for controlling each motor is provided in the main body 442. The drone is remotely controlled by a controller on the ground.

The drone is divided into the upper configuration and the lower configuration by inserting a separation resistor Ry441 of 10 kΩ or more between the upper configuration including the main body 442, the motor 445, the rotor blade 446, and the like and the lower configuration including the metal frame 443. The upper configuration is the first antenna element having a noise source, and the lower configuration is the second antenna element (without ground). A circuit unit such as the rectifier circuit and the detection unit of the power generation device in FIG. 1 is housed in the main body 442.

Moreover, the present technology is applicable not only to drones but also to vehicles, buses, and the like. A vehicle is grounded via the ground resistance of the tire (for example, approximately 10 MΩ) to release static electricity. In the present technology, if at least 10 kΩ or more is present, it is in a floating state. Therefore, in a case where the present technology is applied to an automobile, the first antenna element is a chassis in which the engine and the power source of the vehicle are concentrated. In this case, the door or the hood of the vehicle can be formed as the second antenna element by the separation resistance. By connecting the circuit unit to this portion, it is possible to extract large power.

The harvester according to the present technology can be used as a charging power supply of a battery. For example, in a case where a battery having a charge voltage of about 2.5 V is charged by the power induced in the harvester, a voltage equal to or higher than the upper limit voltage (for example, 2.7 V) cannot be applied to the battery. That is, it is necessary to take measures to prevent a voltage of 2.5 V or more from being applied to the battery by using a Zener diode that functions at 2.5 V for the power induced in the harvester. However, in this case, since the set voltage of the Zener diode is low, the protection current flows from about 1 V, and it is difficult to efficiently charge the battery.

Figure 40:
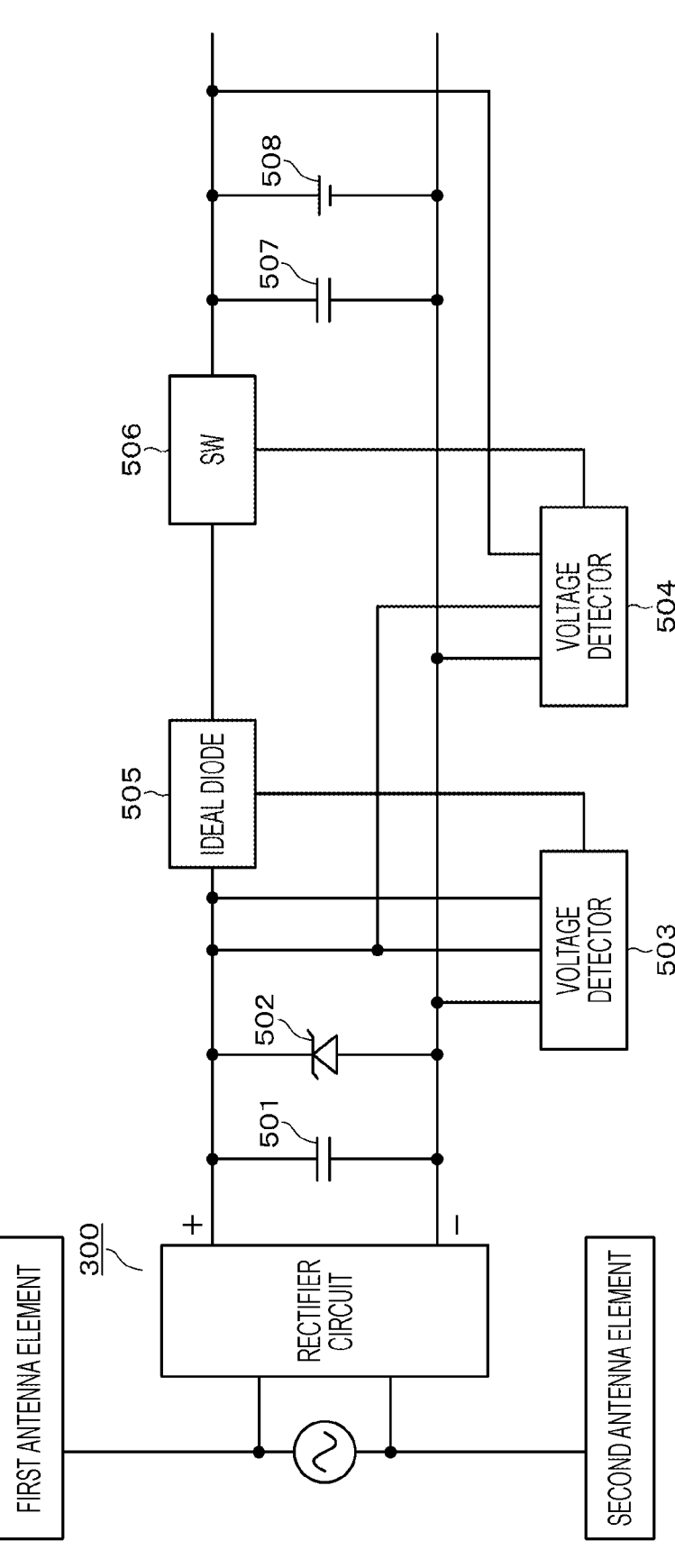
FIG. 40 is a connection diagram illustrating another example in which the present technology is applied to a charging circuit of a battery.

FIG. 40 illustrates an example of a charging circuit that can solve such a problem. The harvester 300 includes a first antenna element, a second antenna element, and a rectifier circuit. This configuration is illustrated in FIG. 4, for example. The first antenna element is a metal such as a refrigerator or a vehicle, and the second antenna element is a pattern of a board, a metal frame, GND, or the like. A positive DC voltage is extracted at one output terminal of the harvester 300, and the other output terminal is set to negative (GND). The rectifier circuit of the harvester 300 is a full-wave rectifier circuit including a diode having a withstand voltage of 50 V. A capacitor 501 having a withstand voltage of 50 V and a Zener diode 502 for protecting a voltage detector 503 are connected between the output terminals of the harvester 300.

The voltage detector 503 detects that the output voltage of the harvester 300 is 2.4 V. Another voltage detector 504 detects that the voltage of a battery 508 is 2.7 V. An ideal diode 505 is controlled by a detection output of the voltage detector 503. A switching circuit 506 for preventing overcharge is connected in series with the ideal diode 505. The switching circuit 506 includes, for example, an FET, and is controlled by a detection output of the voltage detector 504.

The ideal diode 505 is ON when 2.4 V is detected, and the switching circuit 506 is OFF when 2.7 V is detected. A capacitor 507 having a withstand voltage of 10 V is connected to the output side of the switching circuit 506, and the battery 508 is connected in parallel with the capacitor 507. Such a charging circuit is ON when the switching circuit 506 reaches 2.4 V, and is OFF when the battery voltage reaches 2.7 V, so that the charge accumulated in the capacitor 501 can be transferred to the battery 508 at the subsequent stage. Furthermore, by providing the capacitor 507 having a withstand voltage of 10 V before the battery 508, in a case where the switching circuit 506 for preventing overcharge is OFF after the battery voltage is fully charged, it is possible to prevent 6.5 V, which is the voltage of the Zener diode 502 in the previous stage, from being directly applied to the battery at the time of reconnection. Such a charging circuit enables efficient charging in a case where a voltage of 40 V is induced in the harvester 300 in the previous stage.

The harvesters 10, 100 and 300 described above can be applied as power supply devices for the following electronic devices in addition to the devices described above.

A tracker, a monitoring electronic device, a wristband-type healthcare device, a smart watch, a digital wristwatch, a wireless headphone, a wireless mouse, a hearing aid, a game remote controller, a ring-type input device, and the like are also conceivable.

Note that the tracker is a terminal that transmits position information acquired by a global positioning system (GPS) via a telephone network or the like, and displays and browses the position information on a personal computer, a tablet, or a smartphone connected via the Internet.

The energy collection device of the present technology can supply energy to a sensor that is used in a smart factory or a smart city and requires battery replacement or power supply by being in contact with or connected to the sensor, and thus, it is possible to efficiently utilize the energy. Therefore, the present technology can be related to Goal 7 "Affordable and Clean Energy" of the sustainable development goals (SDGs) adopted at the UN summit in 2015.

Although the embodiments of the present technology have been specifically described above, the present technology is not limited to the above-described embodiments, and various modifications based on the technical idea of the present technology can be made. Furthermore, one or a plurality of arbitrarily selected aspects can be appropriately combined. Furthermore, the configurations, methods, steps, shapes, materials, numerical values, and the like of the above-described embodiments can be combined with each other without departing from the gist of the present technology. For example, power generation using the present technology and natural energy, for example, solar power generation or a thermoelectric conversion element may be used in combination to store energy.

REFERENCE SIGNS LIST

1 Antenna unit
2 Rectifier circuit
3 Power storage capacitor

4 Matching circuit
Harvester
11 First antenna element
12 Device board
15 Feeding point
19, 20 Second antenna element
80 Load
100 Harvester
What is claimed is:

1. An energy collection device, comprising:
an antenna unit having a dipole structure, the antenna unit including a first antenna element that is in contact with an industrial product metal portion or a human body and functions as an antenna, and a second antenna element including a conductor, the antenna unit receiving electric field energy of a radio wave and a quasi-electrostatic field existing in space;
a rectifier circuit provided with a switching element that rectifies alternating current (AC) energy output from the antenna unit; and
a power storage capacitor configured to store charge output from the rectifier circuit, wherein the power storage capacitor has a capacitance value of at least 1 µF or more in order to receive power in a low frequency band,
wherein the second antenna element, the rectifier circuit, and the power storage capacitor are at least partially coplanar in the energy collection device in an absence of any part of an area of the rectifier circuit and the power storage capacitor overlapping with any part of an area of the second antenna, and
wherein the second antenna is a ground for the energy collection device.

2. The energy collection device according to claim 1, the switching element is an FET.

3. The energy collection device according to claim 1, wherein the switching element is a diode.

4. The energy collection device according to claim 1, wherein the low frequency is about 1 Hz to 100 Hz.

5. The energy collection device according to claim 4, wherein the low frequency is 75 Hz to 100 Hz.

6. The energy collection device according to claim 1, wherein the rectifier circuit is any one of a half-wave rectifier circuit, a full-wave rectifier circuit, a voltage doubler circuit, and a Cockcroft-Walton circuit.

7. The energy collection device according to claim 1, configured as an integrated circuit.

8. The energy collection device according to claim 1, further comprising a varistor coupled to and between the first antenna element and the second antenna element.

9. The energy collection device according to claim 1, wherein the first antenna element comprises a conductive resin or a conductive rubber.

10. The energy collection device according to claim 1, wherein the first antenna element is capable of being placed in contact with an industrial product metal portion or a human body.

11. An energy collection circuit comprising:
an antenna unit having a dipole structure, the antenna unit including a first antenna element that is capable of being placed in contact with an industrial product metal portion or a human body, and a second antenna element including a conductor, the antenna unit receiving electric field energy of a radio wave and a quasi-electrostatic field existing in space;
a switching element configured to rectify an alternating current output by the antenna unit; and a matching circuit provided between the antenna unit and the switching element, wherein the matching circuit has a configuration of a low-pass filter that makes matching at a specific frequency of 100 MHz or more, and wherein the rectifier circuit is configured to receive electric field energy of both a frequency band of 100 MHz or less and the specific frequency band, wherein the second antenna element and the switching element at least partially occupy a coplanar area of the energy collection device, wherein an area occupied by the second antenna element does not overlap with an area occupied by the switching device, and wherein the second antenna is a ground for the energy collection circuit.

12. The energy collection circuit according to claim 11, wherein the switching element is an FET.

13. The energy collection circuit according to claim 11, wherein the switching element is a diode.

14. The energy collection circuit according to claim 11, wherein the switching element comprises is any one of a half-wave rectifier circuit, a full-wave rectifier circuit, a voltage doubler circuit, and a Cockcroft-Walton circuit.

15. The energy collection circuit according to claim 11, wherein the specific frequency is any of a UHF band of a television signal, a 900 MHz band, a 2.4 GHz band, and a 5 GHz band.

16. The energy collection circuit according to claim 11, configured as an integrated circuit.

17. The energy collection circuit according to claim 11, further comprising a varistor coupled to and between the first antenna element and the second antenna element.

18. An energy collection device, comprising:

an antenna unit having a dipole structure, the antenna unit including a first antenna element, and a second antenna element including a conductor, wherein the antenna unit is capable of receiving electric field energy of a radio wave and a quasi-electrostatic field existing in space;

a rectifier circuit including a switching element configured to rectify an alternating current received from the antenna unit; and a power storage capacitor configured to store charge output from the rectifier circuit, wherein the power storage capacitor has a capacitance value of at least 1 $\mu$F or more in order to receive power in a low frequency band, wherein the second antenna element, the rectifier circuit, and the power storage capacitor are disposed in the energy collection device at least partially coplanar and in an absence of any part of an area of the rectifier circuit and the power storage capacitor overlapping with any part of an area of the second antenna, and wherein the second antenna is a ground for the energy collection device.

19. The energy collection device according to claim 18, wherein the low frequency is about 1 Hz to 100 Hz.

20. The energy collection device according to claim 19, wherein the low frequency is 75 Hz to 100 Hz.

* * * * *